(12) United States Patent
Kim et al.

(10) Patent No.: US 11,832,229 B2
(45) Date of Patent: *Nov. 28, 2023

(54) METHOD AND APPARATUS FOR SUPPORTING MULTIPLE FREQUENCY BANDS IN MOBILE COMMUNICATION SYSTEM

(71) Applicant: Samsung Electronics Co., Ltd., Suwon-si (KR)

(72) Inventors: Sangbum Kim, Suwon-si (KR); Soenghun Kim, Yongin-si (KR); Gert-Jan Van Lieshout, Staines (GB); Himke Van Der Velde, Zwolle (NL); Kyeongin Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/505,106

(22) Filed: Jul. 8, 2019

(65) Prior Publication Data

US 2019/0335461 A1 Oct. 31, 2019

Related U.S. Application Data

(63) Continuation of application No. 14/658,674, filed on Mar. 16, 2015, now Pat. No. 10,349,407, which is a (Continued)

(30) Foreign Application Priority Data

Aug. 9, 2012 (KR) ........................ 10-2012-0087076

(51) Int. Cl.
*H04W 72/00* (2023.01)
*H04W 72/0453* (2023.01)
(Continued)

(52) U.S. Cl.
CPC ......... *H04W 72/0453* (2013.01); *H04L 5/003* (2013.01); *H04W 48/10* (2013.01); *H04W 72/21* (2023.01); *H04W 48/20* (2013.01)

(58) Field of Classification Search
CPC ......... H04W 72/0453; H04W 72/0413; H04W 72/02; H04W 48/10; H04W 48/12;
(Continued)

(56) References Cited

U.S. PATENT DOCUMENTS 5,586,122 A * 12/1996 Suzuki .............. H04W 74/0808
370/347
5,898,681 A 4/1999 Dutta
(Continued)

FOREIGN PATENT DOCUMENTS

CN 1229562 A1 9/1999
CN 1524392 A 8/2004
(Continued)

OTHER PUBLICATIONS

Huawei, HiSilicon, "Multiflow and DTX/DRX", R2-120554, XP050565442, Jan. 31, 2012.
(Continued)

*Primary Examiner* — Ricardo H Castaneyra
(74) *Attorney, Agent, or Firm* — Jefferson IP Law, LLP

(57) ABSTRACT

A method and an apparatus for supporting multiple frequency bands efficiently in a mobile communication system are provided. The method includes generating first system information including a frequency band indicator indicating a frequency band supported by the base station and an additional frequency band indicator indicating at least one frequency band supported by the base station, and broadcasting the first system information.

20 Claims, 8 Drawing Sheets

Related U.S. Application Data continuation of application No. 14/242,456, filed on Apr. 1, 2014, now Pat. No. 8,982,830, which is a continuation of application No. 13/589,729, filed on Aug. 20, 2012, now Pat. No. 8,706,164.

(60) Provisional application No. 61/526,223, filed on Aug. 22, 2011, provisional application No. 61/531,185, filed on Sep. 6, 2011, provisional application No. 61/595,646, filed on Feb. 6, 2012, provisional application No. 61/612,950, filed on Mar. 19, 2012, provisional application No. 61/649,910, filed on May 21, 2012, provisional application No. 61/653,026, filed on May 30, 2012.

(51) Int. Cl.
*H04L 5/00* (2006.01)
*H04W 48/10* (2009.01)
*H04W 72/21* (2023.01)
*H04W 48/20* (2009.01)

(58) Field of Classification Search
CPC . H04W 48/20; H04W 52/265; H04W 52/146; H04W 88/06; H04W 72/21; H04L 5/003; H04L 5/0085; H04L 5/0087; H04L 5/0064; H04L 5/0094
See application file for complete search history.

(56) References Cited

U.S. PATENT DOCUMENTS

| Patent/Publication | Date | Inventor | Classification |
|---|---|---|---|
| 6,370,390 B1 | 4/2002 | Salin et al. | |
| 6,711,149 B1 | 3/2004 | Yano et al. | |
| 7,433,321 B2 | 10/2008 | Grilli et al. | |
| 8,102,754 B2 | 1/2012 | Baldemair et al. | |
| 8,203,987 B2 | 6/2012 | Ishii et al. | |
| 8,285,290 B2 | 10/2012 | Arora et al. | |
| 8,432,843 B2 | 4/2013 | Cai et al. | |
| 8,638,705 B2 | 1/2014 | Park et al. | |
| 8,649,288 B2 | 2/2014 | He et al. | |
| 8,792,417 B2 | 7/2014 | Yeoum et al. | |
| 8,797,989 B2 | 8/2014 | Lee | |
| 8,830,828 B2 | 9/2014 | Guo et al. | |
| 8,868,081 B2 | 10/2014 | Heath et al. | |
| 8,913,518 B2 | 12/2014 | Heo et al. | |
| 8,938,239 B2 | 1/2015 | Kherani et al. | |
| 9,084,074 B2 | 7/2015 | Jang et al. | |
| 9,173,167 B2 | 10/2015 | Somasundaram et al. | |
| 9,220,028 B2 | 12/2015 | Suzuki et al. | |
| 9,237,419 B2 | 1/2016 | Jung et al. | |
| 9,237,473 B2 | 1/2016 | Kazmi et al. | |
| 9,398,551 B2 | 7/2016 | Fwu et al. | |
| 9,408,122 B2 | 8/2016 | Tsai et al. | |
| 9,408,168 B2 | 8/2016 | Seo et al. | |
| 9,485,765 B2 | 11/2016 | Kim et al. | |
| 9,497,649 B2 | 11/2016 | Seo et al. | |
| 9,503,246 B2 | 11/2016 | Bergstrom et al. | |
| 9,608,699 B2 | 3/2017 | Kim et al. | |
| 9,788,244 B2 | 10/2017 | Dinan | |
| 9,788,289 B2 | 10/2017 | Kim et al. | |
| 10,405,277 B2 | 9/2019 | Lee et al. | |
| 2001/0034235 A1 | 10/2001 | Froula | |
| 2003/0223452 A1 | 12/2003 | Toskala et al. | |
| 2004/0032836 A1 | 2/2004 | Grilli et al. | |
| 2004/0053623 A1 | 3/2004 | Hoff et al. | |
| 2004/0146018 A1 | 7/2004 | Walton et al. | |
| 2004/0147274 A1 | 7/2004 | Khawand et al. | |
| 2004/0180675 A1 | 9/2004 | Choi et al. | |
| 2004/0203775 A1 | 10/2004 | Bourdeaut et al. | |
| 2005/0041608 A1 | 2/2005 | Jeong et al. | |
| 2005/0111393 A1 | 5/2005 | Jeong et al. | |
| 2006/0023664 A1 | 2/2006 | Jeong et al. | |
| 2006/0058034 A1 | 3/2006 | Vaittinen et al. | |
| 2006/0079224 A1* | 4/2006 | Welnick | H04W 8/183 455/450 |
| 2006/0281466 A1 | 12/2006 | Gholmieh et al. | |
| 2007/0019643 A1 | 1/2007 | Shaheen | |
| 2007/0032251 A1 | 2/2007 | Shaheen | |
| 2007/0070937 A1* | 3/2007 | Demirhan | H04W 72/563 370/328 |
| 2007/0213033 A1 | 9/2007 | Alper et al. | |
| 2007/0268877 A1 | 11/2007 | Buckley et al. | |
| 2007/0287419 A1 | 12/2007 | Wang | |
| 2008/0010677 A1 | 1/2008 | Kashima et al. | |
| 2008/0095116 A1 | 4/2008 | Kim et al. | |
| 2008/0123655 A1 | 5/2008 | Kim et al. | |
| 2008/0160918 A1 | 7/2008 | Jeong et al. | |
| 2008/0188219 A1 | 8/2008 | Fischer | |
| 2008/0220782 A1 | 9/2008 | Wang et al. | |
| 2008/0225772 A1 | 9/2008 | Xu | |
| 2008/0232310 A1 | 9/2008 | Xu | |
| 2008/0240439 A1 | 10/2008 | Mukherjee et al. | |
| 2008/0268852 A1 | 10/2008 | Petrovic et al. | |
| 2008/0273610 A1 | 11/2008 | Malladi et al. | |
| 2008/0298325 A1 | 12/2008 | Vujcic | |
| 2008/0310367 A1 | 12/2008 | Maylan | |
| 2009/0016266 A1 | 1/2009 | Kim et al. | |
| 2009/0034452 A1 | 2/2009 | Somasundaram et al. | |
| 2009/0034476 A1 | 2/2009 | Wang et al. | |
| 2009/0054055 A1 | 2/2009 | Iwamura et al. | |
| 2009/0103445 A1 | 4/2009 | Sammour et al. | |
| 2009/0124245 A1 | 5/2009 | Somasundaram et al. | |
| 2009/0149189 A1 | 6/2009 | Sammour et al. | |
| 2009/0170498 A1 | 7/2009 | Venkatasubramanian et al. | |
| 2009/0186624 A1 | 7/2009 | Cave et al. | |
| 2009/0191874 A1 | 7/2009 | Du et al. | |
| 2009/0201948 A1 | 8/2009 | Patwardhan et al. | |
| 2009/0221289 A1 | 9/2009 | Xu et al. | |
| 2009/0232118 A1 | 9/2009 | Wang et al. | |
| 2009/0238098 A1 | 9/2009 | Cai et al. | |
| 2009/0238105 A1 | 9/2009 | Wu et al. | |
| 2009/0238129 A1 | 9/2009 | Park et al. | |
| 2009/0238142 A1 | 9/2009 | Chun et al. | |
| 2009/0238366 A1 | 9/2009 | Park et al. | |
| 2009/0239525 A1 | 9/2009 | Cai et al. | |
| 2009/0247176 A1 | 10/2009 | Song et al. | |
| 2009/0253470 A1 | 10/2009 | Xu | |
| 2009/0259910 A1 | 10/2009 | Lee et al. | |
| 2009/0285141 A1 | 11/2009 | Cai et al. | |
| 2009/0296643 A1 | 12/2009 | Cave et al. | |
| 2009/0316586 A1 | 12/2009 | Yi et al. | |
| 2009/0316637 A1 | 12/2009 | Yi et al. | |
| 2009/0316638 A1 | 12/2009 | Yi et al. | |
| 2009/0316664 A1 | 12/2009 | Wu | |
| 2009/0323608 A1 | 12/2009 | Adachi et al. | |
| 2010/0002590 A1 | 1/2010 | Park et al. | |
| 2010/0027471 A1 | 2/2010 | Palanki et al. | |
| 2010/0039988 A1 | 2/2010 | Narasimha et al. | |
| 2010/0041428 A1 | 2/2010 | Chen et al. | |
| 2010/0075635 A1 | 3/2010 | Lim et al. | |
| 2010/0093386 A1 | 4/2010 | Damnjanovic et al. | |
| 2010/0110897 A1 | 5/2010 | Chun et al. | |
| 2010/0111019 A1 | 5/2010 | Wu | |
| 2010/0111032 A1 | 5/2010 | Wu | |
| 2010/0111039 A1 | 5/2010 | Kim et al. | |
| 2010/0113010 A1* | 5/2010 | Tenny | H04L 47/10 455/423 |
| 2010/0118805 A1 | 5/2010 | Ishii et al. | |
| 2010/0135159 A1 | 6/2010 | Chun et al. | |
| 2010/0142485 A1 | 6/2010 | Lee et al. | |
| 2010/0144361 A1 | 6/2010 | Gholmieh et al. | |
| 2010/0165937 A1 | 7/2010 | Yi et al. | |
| 2010/0172280 A1 | 7/2010 | Guo et al. | |
| 2010/0177831 A1 | 7/2010 | Kim et al. | |
| 2010/0189006 A1 | 7/2010 | Mallick et al. | |
| 2010/0189038 A1 | 7/2010 | Chen et al. | |
| 2010/0195524 A1 | 8/2010 | Iwamura et al. | |
| 2010/0195643 A1 | 8/2010 | Kodali et al. | |
| 2010/0202288 A1 | 8/2010 | Park et al. | |
| 2010/0210255 A1 | 8/2010 | Amirijoo et al. | |
| 2010/0210268 A1 | 8/2010 | Lim et al. | |
| 2010/0215020 A1 | 8/2010 | Lee et al. | |

(56) References Cited

U.S. PATENT DOCUMENTS

| | | |
|---|---|---|
| 2010/0226350 A1 | 9/2010 | Lim et al. |
| 2010/0246491 A1 | 9/2010 | Bae et al. |
| 2010/0255847 A1 | 10/2010 | Lee et al. |
| 2010/0265873 A1 | 10/2010 | Yi et al. |
| 2010/0265968 A1 | 10/2010 | Baldemair et al. |
| 2010/0273515 A1 | 10/2010 | Fabien et al. |
| 2010/0278131 A1 | 11/2010 | Jeong et al. |
| 2010/0296409 A1 | 11/2010 | Fok et al. |
| 2010/0296467 A1 | 11/2010 | Pelletier et al. |
| 2010/0317356 A1 | 12/2010 | Roessel et al. |
| 2010/0322197 A1 | 12/2010 | Adjakple et al. |
| 2010/0322217 A1 | 12/2010 | Jin et al. |
| 2010/0323614 A1 | 12/2010 | Yu et al. |
| 2010/0329452 A1 | 12/2010 | Alanara et al. |
| 2010/0330921 A1 | 12/2010 | Kim et al. |
| 2011/0002284 A1 | 1/2011 | Talwar et al. |
| 2011/0003595 A1 | 1/2011 | Shan |
| 2011/0003603 A1 | 1/2011 | Park et al. |
| 2011/0007856 A1 | 1/2011 | Jang et al. |
| 2011/0021197 A1 | 1/2011 | Ngai |
| 2011/0038277 A1 | 2/2011 | Hu et al. |
| 2011/0038313 A1 | 2/2011 | Park et al. |
| 2011/0051609 A1 | 3/2011 | Ishii et al. |
| 2011/0058521 A1 | 3/2011 | Xu et al. |
| 2011/0075636 A1 | 3/2011 | Blomgren et al. |
| 2011/0085535 A1 | 4/2011 | Shaheen |
| 2011/0085566 A1 | 4/2011 | Bucknell et al. |
| 2011/0086635 A1 | 4/2011 | Grob-Lipski |
| 2011/0092217 A1 | 4/2011 | Kim et al. |
| 2011/0103328 A1 | 5/2011 | Lee et al. |
| 2011/0116433 A1 | 5/2011 | Dorenbosch |
| 2011/0134774 A1 | 6/2011 | Pelletier et al. |
| 2011/0158165 A1 | 6/2011 | Dwyer et al. |
| 2011/0158166 A1 | 6/2011 | Lee et al. |
| 2011/0170503 A1 | 7/2011 | Chun et al. |
| 2011/0183662 A1 | 7/2011 | Lee et al. |
| 2011/0188416 A1 | 8/2011 | Faccin et al. |
| 2011/0194432 A1 | 8/2011 | Kato et al. |
| 2011/0194505 A1 | 8/2011 | Faccin et al. |
| 2011/0195668 A1 | 8/2011 | Lee et al. |
| 2011/0195708 A1 | 8/2011 | Moberg et al. |
| 2011/0199923 A1 | 8/2011 | Persson et al. |
| 2011/0201307 A1 | 8/2011 | Segura |
| 2011/0249641 A1 | 10/2011 | Kwon et al. |
| 2011/0256884 A1* | 10/2011 | Kazmi ............... H04W 48/04 455/456.1 |
| 2011/0268087 A1 | 11/2011 | Kwon et al. |
| 2011/0269447 A1 | 11/2011 | Bienas et al. |
| 2011/0275365 A1 | 11/2011 | Fischer et al. |
| 2011/0281578 A1 | 11/2011 | Narsimha et al. |
| 2011/0294491 A1 | 12/2011 | Fong et al. |
| 2011/0299415 A1 | 12/2011 | He et al. |
| 2011/0312316 A1 | 12/2011 | Baldemair et al. |
| 2012/0002635 A1 | 1/2012 | Chung et al. |
| 2012/0008600 A1 | 1/2012 | Marinier et al. |
| 2012/0014357 A1 | 1/2012 | Jung et al. |
| 2012/0020231 A1 | 1/2012 | Chen et al. |
| 2012/0176950 A1 | 1/2012 | Zhang et al. |
| 2012/0040643 A1 | 2/2012 | Diachina et al. |
| 2012/0040677 A1 | 2/2012 | Chen |
| 2012/0044847 A1 | 2/2012 | Chang |
| 2012/0044898 A1 | 2/2012 | Ishii |
| 2012/0051297 A1 | 3/2012 | Lee et al. |
| 2012/0057546 A1 | 3/2012 | Wang et al. |
| 2012/0057560 A1 | 3/2012 | Park et al. |
| 2012/0063300 A1 | 3/2012 | Sahin et al. |
| 2012/0064886 A1 | 3/2012 | Kim et al. |
| 2012/0082052 A1 | 4/2012 | Oteri et al. |
| 2012/0082088 A1 | 4/2012 | Dalsgaard et al. |
| 2012/0082107 A1 | 4/2012 | Ou et al. |
| 2012/0088457 A1 | 4/2012 | Johansson et al. |
| 2012/0088509 A1 | 4/2012 | Yi |
| 2012/0092286 A1 | 4/2012 | O'Prey et al. |
| 2012/0093125 A1 | 4/2012 | Hapsari et al. |
| 2012/0096154 A1 | 4/2012 | Chen et al. |
| 2012/0099545 A1 | 4/2012 | Han et al. |
| 2012/0108199 A1 | 5/2012 | Wang et al. |
| 2012/0113831 A1 | 5/2012 | Pelletier et al. |
| 2012/0113905 A1 | 5/2012 | Anderson et al. |
| 2012/0113915 A1 | 5/2012 | Chen et al. |
| 2012/0113948 A1 | 5/2012 | Kwon et al. |
| 2012/0120821 A1 | 5/2012 | Kazmi et al. |
| 2012/0176926 A1 | 7/2012 | Jang et al. |
| 2012/0178456 A1 | 7/2012 | Peisa et al. |
| 2012/0213203 A1 | 8/2012 | Jung et al. |
| 2012/0218922 A1 | 8/2012 | Klingenbrunn et al. |
| 2012/0236776 A1 | 9/2012 | Zhang et al. |
| 2012/0243498 A1 | 9/2012 | Kwon et al. |
| 2012/0250520 A1 | 10/2012 | Chen et al. |
| 2012/0257513 A1 | 10/2012 | Yamada |
| 2012/0263039 A1 | 10/2012 | Ou et al. |
| 2012/0275390 A1 | 11/2012 | Korhonen et al. |
| 2012/0276897 A1 | 11/2012 | Kwon et al. |
| 2012/0276913 A1 | 11/2012 | Lim et al. |
| 2012/0281566 A1 | 11/2012 | Pelletier et al. |
| 2012/0281580 A1 | 11/2012 | Lee et al. |
| 2012/0281601 A1 | 11/2012 | Kuo et al. |
| 2012/0300714 A1 | 11/2012 | Ng et al. |
| 2012/0300715 A1 | 11/2012 | Pelletier et al. |
| 2012/0300720 A1 | 11/2012 | Gou et al. |
| 2012/0300752 A1 | 11/2012 | Kwon et al. |
| 2012/0307632 A1 | 12/2012 | Guo et al. |
| 2012/0314640 A1 | 12/2012 | Kim et al. |
| 2012/0329458 A1 | 12/2012 | Hjelmgren et al. |
| 2013/0003788 A1 | 1/2013 | Marinier et al. |
| 2013/0010611 A1 | 1/2013 | Wiemann et al. |
| 2013/0010711 A1 | 1/2013 | Larsson et al. |
| 2013/0012186 A1 | 1/2013 | Kim et al. |
| 2013/0028185 A1 | 1/2013 | Wu |
| 2013/0039250 A1 | 2/2013 | Hsu |
| 2013/0040605 A1 | 2/2013 | Zhang et al. |
| 2013/0044651 A1 | 2/2013 | Wang et al. |
| 2013/0044726 A1 | 2/2013 | Shrivastava et al. |
| 2013/0045765 A1 | 2/2013 | Laieinen et al. |
| 2013/0058309 A1 | 3/2013 | Kuo |
| 2013/0070682 A1 | 3/2013 | Kim et al. |
| 2013/0079017 A1 | 3/2013 | Mach et al. |
| 2013/0083739 A1 | 4/2013 | Yamada |
| 2013/0088980 A1 | 4/2013 | Kim et al. |
| 2013/0089079 A1 | 4/2013 | Amirijoo et al. |
| 2013/0107778 A1 | 5/2013 | Ryu et al. |
| 2013/0109320 A1 | 5/2013 | Tomala et al. |
| 2013/0114398 A1 | 5/2013 | Wang |
| 2013/0114577 A1 | 5/2013 | Cai et al. |
| 2013/0121204 A1 | 5/2013 | Lee et al. |
| 2013/0122906 A1 | 5/2013 | Klatt |
| 2013/0163497 A1 | 6/2013 | Wei |
| 2013/0163536 A1 | 6/2013 | Anderson et al. |
| 2013/0188473 A1 | 7/2013 | Dinan |
| 2013/0188600 A1 | 7/2013 | Ye |
| 2013/0189978 A1 | 7/2013 | Lee et al. |
| 2013/0196604 A1 | 8/2013 | Jung et al. |
| 2013/0201960 A1 | 8/2013 | Kim et al. |
| 2013/0235780 A1 | 9/2013 | Kim et al. |
| 2013/0258882 A1 | 10/2013 | Dinan |
| 2013/0265866 A1 | 10/2013 | Yi et al. |
| 2013/0272139 A1 | 10/2013 | Guo et al. |
| 2013/0294293 A1 | 11/2013 | Iwai |
| 2013/0301421 A1 | 11/2013 | Yi et al. |
| 2013/0322302 A1 | 12/2013 | Gholmieh et al. |
| 2013/0343261 A1 | 12/2013 | Gonsa et al. |
| 2014/0016593 A1 | 1/2014 | Park et al. |
| 2014/0023032 A1 | 1/2014 | Kim et al. |
| 2014/0023043 A1 | 1/2014 | Yang et al. |
| 2014/0023055 A1 | 1/2014 | Jeong et al. |
| 2014/0029577 A1 | 1/2014 | Dinan |
| 2014/0044074 A1 | 2/2014 | Chen et al. |
| 2014/0051429 A1 | 2/2014 | Jung et al. |
| 2014/0056246 A1 | 2/2014 | Chun et al. |
| 2014/0071920 A1 | 3/2014 | Amirijoo et al. |
| 2014/0080531 A1 | 3/2014 | Du et al. |
| 2014/0086224 A1 | 3/2014 | Kwon et al. |
| 2014/0105192 A1 | 4/2014 | Park et al. |
| 2014/0112254 A1 | 4/2014 | Lindoff et al. |

(56) References Cited

U.S. PATENT DOCUMENTS

| | | |
|---|---|---|
| 2014/0112276 A1 | 4/2014 | Ahn et al. |
| 2014/0119255 A1 | 5/2014 | Vannithamby et al. |
| 2014/0128029 A1 | 5/2014 | Fong et al. |
| 2014/0169323 A1 | 6/2014 | Park et al. |
| 2014/0171096 A1 | 6/2014 | Hwang et al. |
| 2014/0185595 A1 | 7/2014 | Wu et al. |
| 2014/0219204 A1 | 8/2014 | Park et al. |
| 2014/0220982 A1 | 8/2014 | Jung et al. |
| 2014/0220983 A1 | 8/2014 | Peng |
| 2014/0233516 A1 | 8/2014 | Chun et al. |
| 2014/0233542 A1 | 8/2014 | Bergstrom et al. |
| 2014/0241285 A1 | 8/2014 | Pang et al. |
| 2014/0242974 A1 | 8/2014 | Lee et al. |
| 2014/0294179 A1 | 10/2014 | Sammour et al. |
| 2014/0301317 A1 | 10/2014 | Xu et al. |
| 2014/0321437 A1 | 10/2014 | Wong et al. |
| 2014/0369322 A1 | 12/2014 | Fwu et al. |
| 2015/0003418 A1 | 1/2015 | Rosa et al. |
| 2015/0009923 A1 | 1/2015 | Lei et al. |
| 2015/0009959 A1 | 1/2015 | Uchino et al. |
| 2015/0043458 A1 | 2/2015 | Seo et al. |
| 2015/0044972 A1 | 2/2015 | Lee et al. |
| 2015/0063305 A1 | 3/2015 | Kim et al. |
| 2015/0078286 A1 | 3/2015 | Kim et al. |
| 2015/0111520 A1 | 4/2015 | Hsu |
| 2015/0181625 A1 | 6/2015 | Uchino et al. |
| 2015/0230253 A1 | 8/2015 | Jang et al. |
| 2015/0245261 A1 | 8/2015 | Teyeb et al. |
| 2015/0271740 A1 | 9/2015 | Jang et al. |
| 2015/0296542 A1 | 10/2015 | Heo et al. |
| 2016/0014672 A1 | 1/2016 | Jang et al. |
| 2016/0014673 A1 | 1/2016 | Jang et al. |
| 2016/0050652 A1 | 2/2016 | Wu et al. |
| 2016/0255552 A1 | 9/2016 | Uchino et al. |
| 2017/0195020 A1 | 7/2017 | Ko et al. |

FOREIGN PATENT DOCUMENTS

| | | |
|---|---|---|
| CN | 1671240 A | 9/2005 |
| CN | 1738486 A | 2/2006 |
| CN | 1829380 A | 9/2006 |
| CN | 101242608 A | 8/2008 |
| CN | 101370269 A | 2/2009 |
| CN | 101426256 A | 5/2009 |
| CN | 101668250 A | 3/2010 |
| CN | 101682896 A | 3/2010 |
| CN | 101772928 A | 7/2010 |
| CN | 101841889 A | 9/2010 |
| CN | 101925121 A | 12/2010 |
| CN | 102027798 A | 4/2011 |
| CN | 102098655 A | 6/2011 |
| CN | 102123516 A | 7/2011 |
| CN | 102170644 A | 8/2011 |
| CN | 102238754 A | 11/2011 |
| CN | 102244927 A | 11/2011 |
| CN | 102300203 A | 12/2011 |
| CN | 102415145 A | 4/2012 |
| CN | 103188764 A | 7/2013 |
| EP | 0946071 A2 | 9/1999 |
| EP | 2104256 A1 | 9/2009 |
| EP | 2230872 A1 | 9/2010 |
| EP | 2 265 077 A1 | 12/2010 |
| EP | 2280576 A1 | 2/2011 |
| EP | 2410670 A2 | 1/2012 |
| EP | 2 469 939 A1 | 6/2012 |
| EP | 2555444 A2 | 2/2013 |
| EP | 2693826 A1 | 2/2014 |
| EP | 2849369 A1 | 3/2015 |
| EP | 2849501 A1 | 3/2015 |
| GB | 2 443 233 A | 4/2008 |
| GB | 2461780 A | 1/2010 |
| JP | 2011-502434 A | 1/2011 |
| JP | 2011-78019 A | 4/2011 |
| JP | 2011-514782 A | 5/2011 |
| JP | 2011-193444 A | 9/2011 |
| JP | 2013-520917 A | 6/2013 |
| JP | 2013-135386 A | 7/2013 |
| KR | 10-2005-0015729 A | 2/2005 |
| KR | 10-2005-0032953 A | 4/2005 |
| KR | 10-2008-0031493 A | 4/2008 |
| KR | 10-2008-0054865 A | 6/2008 |
| KR | 10-2008-0073439 A | 8/2008 |
| KR | 10-2008-0089421 A | 10/2008 |
| KR | 10-2009-0019868 A | 2/2009 |
| KR | 10-2009-0086441 A | 8/2009 |
| KR | 10-2010-0017513 A | 2/2010 |
| KR | 10-2010-0034885 A | 4/2010 |
| KR | 10-2011-0049622 A | 4/2010 |
| KR | 10-2010-0051906 A | 5/2010 |
| KR | 10-2010-0106890 A | 10/2010 |
| KR | 10-2010-0108459 A | 10/2010 |
| KR | 10-2010-0126509 A | 12/2010 |
| KR | 10-2010-0133477 A | 12/2010 |
| KR | 10-2010-0135679 A | 12/2010 |
| KR | 10-2010-0137531 A | 12/2010 |
| KR | 10-2010-0139098 A | 12/2010 |
| KR | 10-2011-0000479 A | 1/2011 |
| KR | 10-2011-0000482 A | 1/2011 |
| KR | 10-2011-0010100 A | 1/2011 |
| KR | 10-2011-0036518 A | 4/2011 |
| KR | 10-2011-0090813 A | 8/2011 |
| KR | 10-2011-0093642 A | 8/2011 |
| KR | 10-2011-0109992 A | 10/2011 |
| KR | 10-2012-0034159 A | 4/2012 |
| RU | 2262811 C2 | 10/2005 |
| RU | 2 426 251 C2 | 12/2010 |
| RU | 2411697 C2 | 2/2011 |
| WO | 98/01004 A2 | 1/1998 |
| WO | 98/26625 A2 | 6/1998 |
| WO | 2008/024788 A2 | 2/2008 |
| WO | 2008/137354 A1 | 11/2008 |
| WO | 2009/132290 A2 | 10/2009 |
| WO | 2010/063316 A1 | 6/2010 |
| WO | 2010-121662 A1 | 10/2010 |
| WO | 2010/124228 A2 | 10/2010 |
| WO | 2010/125969 A1 | 11/2010 |
| WO | 2011/017849 A1 | 2/2011 |
| WO | 2011/038272 A1 | 3/2011 |
| WO | 2011/007985 A3 | 4/2011 |
| WO | 2011038625 A1 | 4/2011 |
| WO | 2011/059187 A2 | 5/2011 |
| WO | 2011/071223 A1 | 6/2011 |
| WO | 2011/085802 A1 | 7/2011 |
| WO | 2011/093666 A2 | 8/2011 |
| WO | 2011/099725 A2 | 8/2011 |
| WO | 2011/100492 A1 | 8/2011 |
| WO | 2011/100673 A1 | 8/2011 |
| WO | 2011-105856 A2 | 9/2011 |
| WO | 2011/139069 A1 | 11/2011 |
| WO | 2011/154761 A1 | 12/2011 |
| WO | 2011/155784 A2 | 12/2011 |
| WO | 2011/157292 A1 | 12/2011 |
| WO | 2012/008691 A2 | 1/2012 |
| WO | 2012-021138 A1 | 2/2012 |
| WO | 2012-108811 A1 | 8/2012 |
| WO | 2012/108876 A1 | 8/2012 |
| WO | 2012/137034 A1 | 10/2012 |
| WO | 2012/141483 A2 | 10/2012 |
| WO | 20131/005855 A1 | 1/2013 |
| WO | 2013/051836 A1 | 4/2013 |
| WO | 2013/051912 A2 | 4/2013 |
| WO | 2013/065995 A1 | 5/2013 |
| WO | 2014/031989 A1 | 2/2014 |

OTHER PUBLICATIONS

Extended European Search Report dated on Jan. 26, 2016, issued in European Application No. 13787085.3-1870.
Korean Office Action dated Mar. 6, 2019, issued in Korean Application No. 10-2013-0050776.
Korean Office Action dated Mar. 13, 2019, issued in Korean Application No. 10-2013-0004568.

(56) References Cited

OTHER PUBLICATIONS

Korean Office Action dated Mar. 14, 2019, issued in Korean Application No. 10-2012-0140229.
Korean Office Action dated Mar. 18, 2019, issued in Korean Application No. 10-2012-0087760.
Korean Office Action dated Mar. 11, 2019, issued in Korean Application No. 10-2012-0085793.
Qualcomm Incorporated, Separate UE capability for FDD and TDD, 3GPP TSG RAN WG2 #74, R2-113059, Barcelona, Spain, May 9-13, 2011.
Qualcomm Incorporated, UE capability for FDD and TDD, 3GPP TSG RAN WG2 #73bis, R2-111868, Shanghai, China, Apr. 11-15, 2011.
Qualcomm Incorporated, Introduction of UE capability for handover between FDD and TDD, 3GPP TSG RAN WG2 #74, R2-113056, Barcelona, Spain, May 9-13, 2011.
Ericsson et al., "Registration of MME for SMS", 3GPP SA WG2 Meeting #93, 2012. 10. 12. S2-124181, Sofia, Bulgaria Oct. 12, 2012.
Intel Corporation, Configuration of multiple TA in Rel-11 CA, 3GPP TSG RAN WG2 #74, 3GPP, R2-113215, Barcelona, Spain, May 3, 2011.
InterDigital Communications, Support for multiple Timing Advance in LTE CA, 3GPP TSG RAN WG2 #74, 3GPP, R2-113255, Barcelona, Spain, May 3, 2011.
Huawei et al. Discussion on TA group management, 3GPP TSG RAN WG2 #74, 3GPP, R2-113285, Barcelona, Spain, May 3, 2011.
CATT, Corrections and Clarifications on UTRA related FGIs, 3GPP TSG-RAN WG2#77bis, R2-121551, Mar. 26-30, 2012, Jeju, Korea.
CATT, Corrections and Clarifications on UTRA related FGIs, 3GPP TSG-RAN WG2#77bis, R2-121549, Mar. 26-30, 2012, Jeju, Korea.
CATT, Analysis on FGIs for ¾-mode UE, 3GPP TSG-RAN WG2#77bis, R2-121173, Mar. 26-30, 2012, Jeju, Korea.
Australian Office Action dated Jan. 10, 2018, issued in the Australian Patent Application No. 2017200065.
Japanese Office Action dated Dec. 25, 2017, issued in the Japanese Patent Application No. 2016-223589.
Russian Office Action dated Nov. 8, 2017, issued in the Russian Patent Application No. 2016139252.
Media Tek, Reporting Pcmax, 3GPP TSG-RAN WG2 Meeting #74 R2-113081, 3, May 9, 2011.
Inter Digital Communications PCMAX Inclusion for Inter-band PHR R2-116105, Nov. 18, 2011.
3GPP, 3rd Generation Partnership Project; Technical Specification Group Radio Access Network; Evolved Universal Terrestrial Radio Access (E-UTRA); Radio Resource Control (RRC); Protocol Specification (Release 10), 3GPP TS 36.331, Jun. 2011, V10.2.0., Sophia Antipolis, France.
Nokia Siemens Networks, General Considerations on New Carrier Types, 3GPP TSG RAN WG1 #68, Feb. 6-10, 2012, R1-120711, Dresden, Germany.
Huawei et al., The MDT Applicability of EPLMN, 3GPP TSG-WG2 Meeting #75, Aug. 22-26, 2011, R2-114011, Athens, Greece.
3GPP, 3rd Generation Partnership Project; Technical Specification Group Radio Access Network; Universal Terrestrial Radio Access (UTRA) and Evolved Universal Terrestrial Radio Access (E-UTRA); Radio Measurement Collection for Minimization of Drive Tests (MDT); Overall description; Stage 2 (Release 10), 3GPP TS 37.320, Sep. 2011, V10.4.0, Sophia Antipolis, France.
3GPP, 3rd Generation Partnership Project; Technical Specification Group Radio Access Network; Study on Minimization of Drive-Tests in Next Generation Networks; (Release 9), 3GPP TR 36.805, Sep. 2009, V9.0.0, Sophia Antipolis, France.
23.1 RRC Connection Establishment, Aug. 12, 2011, www.lte-bullets.com.
LG Electronics Inc, FGI bit 25, 3GPP Draft, R2-113277 FGI Bit for Inter-Frequency Measurements and Reporting, 3rd Generation Partnership Project (3GPP), Mobile Competence Centre, 650, Route Des Lucioles, F-06921 Sophia-Antipolis Cedex, France, vol. RAN WG2, No. Barcelona, Spain; May 9, 2011, May 3, 2011, XP050495420.

3rd Generation Partnership Project; Technical Specification Group Radio Access Network; Evolved Universal Terrestrial Radio Access (E-UTRA); User Equipment (UE) radio transmission and reception (Release 10), 3GPP Standard; 3GPP TS 36.101, No. V10.3.0, Jun. 21, 2011, pp. 1-237, XP050553331.
European Search Report dated Mar. 14, 2018, issued in European Application No. 18157697.6-1231.
European Office Action dated Apr. 13, 2018, issued in European Application No. 12 826 373.8-1218.
Korean Office Action dated Feb. 2, 2018, issued in Korean Application No. 10-2012-0016971.
LG Electronics Inc. et al., R2-113282, Capability indication of handover support between LTE FDD and LTE TDD, 3GPP TSG RAN WG2 #74. Barcelona, Spain, May 3, 2011.
Nokia Corporation et al., R2-106934, UE capability signaling for CA and MIMO in REL10, 3GPP TSG RAN WG2 #72. Jacksonville, U.S.A., Nov. 28, 2010.
HTC Corporation et al., R2-100769, Correction to field descriptions of UE-EUTRA-Capability, 3GPP TSG RAN WG2 #68bis. Valencia, Spain, Jan. 21, 2010.
"3rd Generation Partnership Project; Technical Specification Group Services and System Aspects; Service accessibility (Release 10)", 3GPP Draft; 3GPP TS 22.011 V10.3.0 3rd Generation Partnership Project (3GPP), Mobile Competence Centre; 650, Route Des Lucioles; F-06921 Sophia-Antipolis Cedex; France, XP050914344, Apr. 1, 2011.
Korean Office Action dated Jun. 17, 2019, issued in Korean Application No. 10-2019-0068946.
Korean Office Action dated May 29, 2019, issued in Korean Application No. 10-2014-7035538.
Indian Office Action dated Jul. 3, 2019, issued in Korean Application No. 62/KOLNP/2014.
Canadian Search Report dated Jun. 6, 2019, issued in Canadian Application No. 2,859,499.
Vodafone, "Extended ACB for UTRAN", 3GPP TSG-RAN WG2#72 R2-106275, 3GPP, Nov. 9, 2010.
Vodafone, "Rejection of Connections towards a congested CN Node for UMTS and LTE", 3GPP TSG-RAN WG3#69bis R3-102964, 3GPP, Oct. 12, 2010.
ITRI, "Handling of Roaming MTC Devices for CN overload control", 3GPP TSG-RAN WG2#72bis R2-110399, 3GPP, Jan. 11, 2011.
Nec et al., "vSRVCC Enhancements in TS 24.301 excluding vSRVCC indicator (terminology variant 2)", 3GPP TSG-CT WG1#72 C1-112670, 3GPP, Jul. 4, 2011.
Interdigital, "RACH with Carrier Aggregation", 3GPP Draft, R2-102132 (RACH in CA), 3rd Generation Partnership Project (3GPP), Mobile Competence Centre; 650 , Route Des Lucioles, F-06921 Sophia-Antipolis Cedex, France, vol. RAN WG2, No. Beijing , china, Apr. 12, 2010, Apr. 6, 2010 (Apr. 6, 2010), XP050422566.
"3rd Generation Partnership Project; Technical Specification Group Radio Access Network; Evolved Universal Terrestrial Radio Access (E-UTRA); Medium Access Control (MAC) protocol specification (Release 11)", 3GPP Standard; 3GPP TS 36.321, 3rd Generation Partnership Project (3GPP), Mobile Competence Centre; 650, Route Des Lucioles, F-06921 Sophia-Antipolis Cedex, France, vol. RAN WG2, No. V11.0.0, Sep. 21, 2012 (Sep. 21, 2012), pp. 1-55, XP050649832.
"3rd Generation Partnership Project; Technical Specification Group Radio Access Network; Evolved Universal Terrestrial Radio Access(E-UTRA);Medium Access Control (MAC) Protocol Specification (Release10)", TS36.321, V10.1.0, Mar. 2011.
Ericsson et al., "Multiple frequency band indicators per cell", 3GPP TSG-RAN WG2 #75, R2-114299, http://www.3gpp.org/ftp/tsg_ran/WG2_RL2/TSGR2_75/docs/R2-114299.zip, Aug. 26, 2011 (Aug. 26, 2011).
Ericsson et al., "Multiple frequency band indicators per cell", 3GPP TSG-RAN2 Meeting #75, R2-114301, http://www.3gpp.org/ftp/tsg_ran/WG2_RL2/TSGR2_75/docs/R2-114301 .zip, Aug. 26, 2011 (Aug. 26, 2011).
Korean Office Action dated Jun. 15, 2018, issued in Korean Application No. 10-2012-0037390.

(56) References Cited

OTHER PUBLICATIONS

Korean Office Action dated Jun. 12, 2018, issued in Korean Application No. 10-2014-7024860.
Rapporteur (Ericsson) et al., R2-115078, UE soft buffer handling in MAC, 3GPP TSG RAN WG2 #75bis, Oct. 4, 2011.
Huawei, HiSilicon, "EAB parameters in shared network", 3GPP TSG-RAN WG2 Meeting #76, R2-115830, Nov. 8, 2011.
MediaTek, "Further details on EAB", 3GPP TSG-RAN2 #76, R2-116094, Nov. 8, 2011.
ZTE, Panasonic, SierraWireless "Clarification on how EAB is applied in Shared Network", 3GPP TSG-SA WG1 Meeting #54, S1-111310, May 13, 2011.
LG Electronics Inc., "FGI bit 25", 3GPP TSG-RAN WG2 #74, R2-113277, May 14, 2011.
3GPP, TS36.321 v10.1.0, Evolved Universal Terrestrial Radio Access (E-UTRA); Medium Access Control (MAC) protocol specification, Apr. 5, 2011.
Ericsson, R2-080934, Details of MAC DRX Control, 3GPP TSG RAN WG2 #61, Feb. 4, 2008.
Qualcomm Incorporated: "Assistance Information for MBMS UEs in RRC_IDLE mode", 3GPP Draft; R2-115104, 3rd Generation Partnership Project (3GPP), Mobile Competence Centre; 650, Route Des Lucioles; F-06921 Sophia-Antipolis Cedex; France, (Oct. 3, 2011), vol. RAN WG2, No. Zhuhai; Oct. 10, 2011, pp. 1-3, XP050540796, Oct. 3, 2011.
Huawei et al: "How does the UE determine whether neighbour cells of MBMS frequency can provide the services that it is interested to receive", 3GPP Draft; R2-114430. ZIP:R2-114430 How Does the UE Determine Whether Neighbor Cells of MBMS Frequency Can Provide the Services That It Is Interested to Receive, 3rd Generation Partnership Project (3GPP), Mobile Competence Centre; 650, Route Des, (Aug. 16, 2011). vol. RAN WG2, No. Athens, Greece; Aug. 22, 2011, pp. 1/4-4/4, XP050552786, Aug. 16, 2011.
Huawei: "[75#35]—LTE: MBMS Service Continuity", 3GPP Draft; R2-115017 Summary of Email Discussion 75#35 LTE—MBMS Service Continuity, 3rd Generation Partnership Project (3GPP), Mobile Competence Centre; 650, Route Des Lucioles; F-06921 Sophia-Antipolis Cedex; France, (Oct. 4, 2011), vol. RAN WG2, No. Zhuhai; Oct. 10, 2011, pp. 1-20, XP050540930, Oct. 4, 2011.
Randy H. Katz, "Adaptation and Mobility in Wireless Information Systems", IEEE Personal Communications, (1994), XP011415559, 1994.
3GPP, R4-114382 TR 37.806 v1.1.0 change bars, Aug. 17, 2011.
Korean Notice of Allowance dated Feb. 26, 2020, issued in Korean Application No. 10-2012-0087076.
Korean Office Action dated Feb. 26, 2020, issued in Korean Application No. 10-2012-0113330.
Korean Notice of Allowance dated Mar. 30, 2020, issued in Korean Application No. 10-2013-0046659.
Chinese Office Action dated Mar. 27, 2020, issued in Chinese Application No. 201711026422.6.
Chinese Office Action dated Apr. 3, 2020, issued in Chinese Application No. 201710709108.1.
Korean Office Action dated Apr. 13, 2020, issued in Korean Application No. 10-2012-0087760.
Brazilian Office Action dated Apr. 7, 2020, issued in Brazilian Application No. 112014008713-0.
Brazilian Office Action dated Mar. 30, 2020, issued in Brazilian Application No. 112014004199-7.
3GPP, TS36.321 v10.4.0, E-UTRA; Medium Access Control (MAC) protocol specification (Release 10), Dec. 15, 2011.
Panasonic, "Random Access procedure for multiple TA", 3GPP TSG RAN WG2#75, 3GPP server published date Aug. 16, 2011, R2-113829.
Ericsson et al., "Introduction of Carrier Aggregation", 3GPP TSG RAN WG2#72, 3GPP server published date Nov. 8, 2010, R2-106133.
Samsung, "PS-only high level function description", 3GPP TSG SA WG2 Meeting #89, Oct. 12, 2012, S2-110485.
Intel Corporation, "EAB for RAN overload protection", 3GPP TSG RAN WG2 Meeting #74, May 13, 2011, R2-113217.
Alcatel-Lucent, "Report of Email discussion on 68b#21 LTE: 36.331 CR for "full configuration"", pp. 1-4, Feb. 24, 2010, R2-101376, XP050605024.
Nokia Siemens Networks et al, "POCP SN extension in Rel-11", pp. 1-4, Aug. 7, 2012, R2-123432, XP050665554.
Korean Office Action dated Nov. 28, 2019, issued in Korean Application No. 10-2013-0006771.
Korean Office Action dated Dec. 2, 2019, issued in Korean Application No. 10-2013-0046659.
Korean Office Action dated Feb. 4, 2020, issued in Korean Application No. 10-2014-7031376.
Korean Office Action dated Feb. 4, 2020, issued in Korean Application No. 10-2014-7031585.
Korean Office Action dated Feb. 5, 2020, issued in Korean Application No. 10-2019-0169542.
Korean Notice of Allowance dated Dec. 19, 2019, issued in Korean Application No. 10-2012-0140229.
Chinese Office Action dated Dec. 30, 2019, issued in Chinese Application No. 201710210508.8.
Extended European Search Report dated Feb. 2, 2020, issued in European Application No. 19206062.2-1218.
3GPP TSG-RAN2 WG2 Meeting #75, Athens, Greece, Aug. 22-26, 2011, R2-114568, Aug. 23, 2011.
Nokia Siemens Networks, Nokia Corporation, "HARQ comparison for soft buffer handling", 3GPP TSG-RAN WG2 Meeting #75bis, Zhuhai, China, Oct. 10-14, 2011, R2-114940, Oct. 10, 2011.
Chinese Office Action dated Jul. 21, 2020, issued in Chinese Application No. 201810059259.1.
Japanese Notice of Allowance dated Aug. 25, 2020, issued in Japanese Patent Application No. 2018-222395.
Korean Decision of Patent dated Aug. 31, 2020, issued in Korean Application No. 10-2012-0113330.
Korean Decision of Patent dated Jun. 23, 2020, issued in Korean Application No. 10-2014-7031585.
Korean Decision of Patent dated Jun. 29, 2020, issued in Korean Application No. 10-2019-0037950.
Ericsson et al., R2-114033, CSI and SRS reporting at unexpected DRX state change, 3GPP TSG RAN WG2 #75, Aug. 15, 2011.
Nokia Siemens Networks et al., R2-114021, Clarification on CQI/SRS reporting during DRX, 3GPP TSG RAN WG2 #75, Aug. 15, 2011.
3GPP, "3rd Generation Partnership Project; Technical Specification Group Radio Access Network; Study on Minimization of drive-tests in Next Generation Networks (Release 9)", 3GPP TR 36.805 V9.0.0, Dec. 21, 2009.
Ericsson et al., "Accessibility measurements for MDT", 3GPP TSG-RAN WG2 #76, R2-116148, Nov. 8, 2011.
3GPP, "3rd Generation Partnership Project; Technical Specification Group Radio Access Network; Evolved Universal Terrestrial Radio Access (E-UTRA); Radio Resource Control (RRC); Protocol specification (Release 9)", 3GPP TS 36.331 V10.4.0, Dec. 20, 2011.
3GPP, "3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10)" 3GPP TS 37.320 V10.4.0, Dec. 2011.
Huawei, HiSilicon "Consideration on coverage optimization", 3GPP TSG-RAN WG2 Meeting #76 San Francisco, USA, 3GPP R2-115885, Nov. 14-18, 2011.
Ericsson et al: "Multiple frequency band indicators per cell", 3GPP Draft; R2-114299 Multiple FBI, 3rd Generation Partnership Project (3GPP), Mobile Competence Centre ; 650, Route Des Lucioles ; F-06921 Sophia Anti Polis Cedex ; France, vol. Ran WG2, No. Athens, Greece; Aug. 22, 2011, Aug. 16, 2011 (Aug. 16, 2011), pp. 1/5-5/5, XP050540038, Aug. 16, 2011.
Ericsson et al: "Multiple frequency band indicators per cell", 3GPP Draft; R2-114301 36.331 CR Multiple FBI, 3rd Generation Partnership Project (3GPP), Mobile Competence Centre ; 650, Route Des Lucioles ; F-06921 Sophia-Anti Polis Cedex ; France, 1-16 vol. RAN WG2, No. Athens, Greece; Aug. 22, 2011, Aug. 16, 2011 (Aug. 16, 2011), pp. 1-7, XP050540040, Aug. 16, 2011.

(56) References Cited

OTHER PUBLICATIONS

Huawei et al: "Signalling for the TA Group Management", 3GPP Draft; R2-115827 Singalling for the TA Group Management, 3rd Generation Partnership Project (3GPP). Mobile Competence Centre; 650, Route Des Lucioles; France vol. RAN WG2. No. San Francisco. USA; F-06921 Sophia-Antipolis Cedex; XP050564319, Nov. 8, 2011.
Catt et al: "Frame and SFN timing in CA", et al: "Frame and SFN timing in CA", 3GPP Draft; R2-103521, 3rd Generation Partnershiproject (3GPP), Mobile Competence Centre; 650, Route Des Lucioles; F-06921 Sophia-Antipolis Cedex; France, vol. RAN WG2, No. Stockholm, Sweden; XP050451101, Jun. 22, 2010.
Pantech: IDC trigger procedure, 3GPP Draft; R2-120664 IDC Trigger Procedure, 3rd Generation Partnership Project (3GPP), Mobile Competence Centre ; 650, Route Des Lucioles ; F-06921 Sophia-Antipolis Cedex ; France, vol. RAN WG2, No. Dresden, Germany; Nov. 14, 2011-Nov. 18, 2011, Jan. 31, 2012 (Jan. 31, 2012).
Research in Motion UK Limited: "Interference measurement for BT", 3GPP Draft; R2-120183, 3rd Generation Partnership Project (3GPP), Mobile Competence Centre ; 650, Route Des Lucioles ; F-06921 Sophia-Antipolis Cedex; France, vol. RAN WG2, No. Dresden, Germany; Feb. 6, 2012-Feb. 10, 2012, Jan. 27, 2012 (Jan. 27, 2012), XP050564912.
Ericsson et al., R2-105210, Introduction of relays in MAC, 3GPP TSG RAN WG2 #71, Oct. 5, 2010.
Texas Instruments, R1-100745, Increasing Sounding Capacity for LTE-A, 3GPP TSG RAN WG1 #59bis, Jan. 21, 2010.
ETSI TS 137 320 V10.1.0, Universal Mobile Telecommunications System (UMTS); LTE; Universal Terrestrial Radio Access (UTRA) and Evolved Universal Terrestrial Radio Access (E-UTRA); Radio measurement collection for Minimization of Drive Tests (MDT); Overall description; Stage 2, Apr. 2011.
Huawei, Time alignment in inter-frequency measurement[online], 3GPP TSG-RAN WG2#75bis R2-115166 <URL:http://www.3gpp.org/ftp/tsg_ran /WG2_RL2/TSGR2_75bis/Docs/R2-115166.zip, Oct. 10, 2011.
Korean Office Action dated Sep. 4, 2019, issued in Korean Application No. 10-2012-0011330.
Korean Notice of Allowance dated Sep. 5, 2019, issued in Korean Application No. 10-2013-0002595.
Korean Notice of Allowance dated Sep. 18, 2019, issued in Korean Application No. 10-2013-0004568.
Indian Office Action dated Sep. 18, 2019, issued in Indian Application No. 3851/KOLNP/2013.
Extended European Search Report dated Oct. 7, 2019, issued in European Application No. 19184016.4-1218.
Extended European Search Report dated Oct. 24, 2019, issued in European Application No. 19179723.2-1218.
Korean Office Action dated Oct. 23, 2019, issued in Korean Application No. 10-2012-0087760.
Korean Notice of Allowance dated Oct. 24, 2019, issued in Korean Application No. 10-2013-0051929.
Japanese Office Action dated Nov. 5, 2019, issued in Japanese Application No. 2018-222395.
Nokia Siemens Networks, InterDigital Communications, "Further considerations on inter-site DTX/DRX with HSDPA Multiflow", 3GPP TSG-RAN WG2 Meeting #77bis, R2-121777, Mar. 20, 2012.
Korean Decision of Patent dated May 28, 2020, issued in Korean Application No. 10-2013-0006771.
European Office Action dated Mar. 13, 2020, issued in European Application No. 13787085.3-1218.
Japanese Office Action dated Apr. 27, 2018, issued in Japanese Application No. 2017-074583.
Japanese Office Action dated Jun. 11, 2018, issued in Japanese Application No. 2017-111875.
Australian Office Action dated Jun. 5, 2018, issued in Australian Application No. 2017203059.
Canadian Office Action dated Jun. 7, 2018, issued in Canadian Application No. 2,845,779.
European Search Report dated Jun. 7, 2018, issued in European Application No. 18160008.1.
Korean Intellectual Property Decision to Grant dated Dec. 12, 2018, issued in the Korean Application No. 10-2012-0037390.
Indian Office Action dated Nov. 27, 2018, issued in the Indian Application No. 2519/KOLNP/2014.
Pantech, IDC Trigger Procedure, 3GPP TSG-RAN WG2 Meeting #77, R2-120664, Nov. 14-18, 2011, Dresden, Germany.
Motorola, Solution for Extra Low Power Consumption and Time Controlled, 3GPP TSG SA WG2 Meeting #78, Feb. 22-26, 2010, TD S2-101215, San Francisco, USA.
Interdigital Communications, Handling of SCell Activation/Deactivation RF Retuning Interruptions, 3GPP TSG RAN WG2 #78, May 21-25, 2012, R2-122289, Prague, Czech Republic.
Renasas Mobile Europe Ltd., Considerations on Returning Interruptions, 3GPP TSG-RAN WG4 Meeting #63, May 21-25, 2012, R4-123056, Prague, Czech Republic.
Ericsson et al., Extended Access Barring for MTC Devices, 3GPP TSG-RAN WG2 #74, May 9-13, 2011, R2-113030, Barcelona, Spain.
LG Electronics Inc., Further Discussion on EAB, 3GPP TSG-RAN WG2 #74, May 9-13, 2011, R2-113339, Barcelona, Spain.
3rd Generation Partnership Project; Technical Specification Group Services and System Aspects; Service Accessibility (Release 11), 3GPP TS 22.011, Jun. 2011, V11.0.0, Sophia Antipolis, France.
Japanese Decision to Decline the Amendment dated Apr. 4, 2017, issued in the Japanese Application No. 2014-524941.
Japanese Ruling of Refusal dated Dec. 26, 2016, issued in the Japanese Application No. 2014-524941.
Chinese Office Action dated Jun. 22, 2017, issued in the Chinese Application No. 201380018209.4.
Chinese Office Action dated Jun. 26, 2017, issued in the Chinese Application No. 201380016921.0.
Chinese Office Action dated Aug. 22, 2017, issued in the Chinese Application No. 201380038905.1.
Chinese Office Action dated Sep. 5, 2017, issued in the Chinese Application No. 201380024026.3.
Japanese Office Action dated Dec. 17, 2018, issued in the Japanese Application No. 2018-073713.
Korean Intellectual Property Office Action dated Dec. 20, 2018, issued in the Korean Application No. 10-2013-0012964.
Korean Intellectual Property Office Action dated Dec. 15, 2018, issued in the Korean Application No. 10-2014-7028047.
Samsung: "Discussion on CQI/SRS transmission during DRX", 3GPP TSG-RAN2 #75 Meeting, R2-114180, XP050539989, published on Aug. 22, 2011.
Samsung, "PS-only high level function description", 3GPP TSG SA WG2 Meeting #89, S2-110485, published on Jan. 31, 2012.
European Office Action dated Jul. 24, 2018, issued in European Application No. 12 839 782.5-1214.
"Adaptation and Mobility in Wireless Information Systems", Randy H. Katz, IEEE Personal Communications, 1994.
Korean Office Action dated May 1, 2019, issued in Korean Application No. 10-2013-0051929.
Korean Decision to Grant dated Apr. 10, 2019, issued in Korean Application No. 10-2012-0112390.
Korean Decision to Grant dated May 2, 2019, issued in Korean Application No. 10-2019-7009763.
3GPP TSG RAN WG2 #77bis, "On the reporting the failed RRC connection establishment", R2-121272, Mar. 26-30, eo12, Jeju Island, Korea.
NTT Docomo, Further discussions on L TE-A UE categories/capabilities, 3GPP TSG-RAN WG4 Ad-hoc meeting 1'2010-04, R4-103470_Xi'an, China, Oct. 11-15, 2010_.
3GPP TS 36.331 V10.5.0, 3rd Generation Partnership Project; Technical Specification Group Radio Access Network; Evolved Universal Terrestrial Radio Access (E-UTRA); Radio Resource Control (RRC); Protocol specification (Release 10), Mar. 2012.
Korean Intellectual Property Office Action dated Jan. 21, 2019, issued in Korean Application No. 10-2014-7027400.
LG Electronics Inc., R2-114456, EAB model in UE, 3GPP TSG RAN WG2 #75. Athens, Greece, Aug. 22-26, 2011.

(56) References Cited

OTHER PUBLICATIONS

Research in Motion Ltd: "Go to Long Sleep Command for L TE DRX", 3GPP Draft; R2-081868, 3rd 13Eneration Partnership Project (3GPP), Mobile Competence Centre; 650, Route Des Lucioles; F-06921 Sophia-Antipolis Cedex; France, XP050139558, dated Mar. 25, 2008.
Lte: E-UTRA; MAC Protocol Specification (3GPP TS 36.321 Version 10.2.0 Release 1or, ETSI TS 136 321 V10.2.0., pp. 34-35,41-44, XP055319954. Dated Jun. 28, 2011.
Motorola Mobility: "Reference and Synchronisation Signals in Additional Carrier Type", 3GPP Draft; R.1-120515-Additional Carrier Types_RS Sync, 3rd Generation Partnership Project (3GPP), Mobile Competence Centre; 650, Route Des Lucioles ; F-06921 Sophia-Antipolis Cedex ; France, vol. RAN WGI, No. Dresden, Germany; XP050563331. Dated Feb. 2, 2002.
New Postcom: "Considerations on measurement for additional carrier types", 3GPP Draft; R1-113701_Considerations on Measurement for Additional Carrier Types, 3rd Generation Partnership Project (3GPP), Mobile Competence Centre; 650, Route Des Lucioles ; F-06921 Sophia-Antipolis Cedex; France, vol. RAN WGI, No. San Francisco, USA; XP050562373. Dated Nov. 10, 2011.
Vancouver. et al., "Support for Enhanced UE Battery Saving", SA WG2 Meeting #89 S2-120715, Dated Jan. 31, 2012.
Ericsson, ST-Ericsson, Huawei, Hisilicon, Alcatel-Lucent, Verizon Wireless, Nokia Siemens Networks, SMS over SGs usage to support NAS procedures for PS only SMS, 3GPP TSG-SA WG2#89 S2-121108, 3GPP, Dated Feb. 10, 2011.
Huawei, HiSilicon, Enabling SMS for PS-only, 3GPP TSG-SA WG2#87 S2-114186, 3GPP, Dated Oct. 4, 2011.
Extended European Search Reports dated Nov. 19, 2018, issued in the European Application No. 18186199.8-1218.
Extended European Search Reports dated Nov. 26, 2018, issued in the European Application No. 18192775.7-1218.
Nokia Corporation et al., RACH and Carrier Aggregation, 3GPP TSG-RAN WG2 Meeting #68, Nov. 9-13, 2009, R2-096844, Jeju, South Korea.
Asustek, Issues of Random Access Procedure on SCell, 3GPP TSG-RAN WG2 Meeting #74, May 9-13, 2011, R2-112922, Barcelona, Spain.
ITRI, Considerations on Random Access on SCell, 3GPP TSG RAN WG2 #74, May 9-13, 2011, R2-113192, Barcelona, Spain.
New Postcom, Consideration on RA Response Window Size for SCell, 3GPP TSG RAN WG2 Meeting #79, Aug. 13-17, 2012, R2-123485, Qingdao, China.
Huawei et al., Enabling SMS for PS-Only, SA WG2 Meeting #87, Oct. 10-14, 2011, S2-114586, Jeju, Korea.
3GPP, 3rd Generation Partnership Project; Technical Specification Group Services and System Aspects; Group Services and System Aspects; Circuit Switched (CS) fallback in Evolved Packet System (EPS); Stage 2 (Release 10), 3GPP TS 23.272, Sep. 2011, V10.5.0, Sophia Antipolis, France.
Alcatel-Lucent et al., RA Procedure on SCell, TSG-RAN WG2#77, Feb. 6-10, 2012, R2-120603, Dresden, Germany.
3GPP, 3rd Generation Partnership Project; Technical Specification Group Radio Access Network; Study on Minimization on drive-tests in Next Generation Networks (Release 9), 3GPP TR 36.805, Dec. 2009, V9.0.0, Sophia Antipolis, France.
3GPP, Evolved Universal Terrestrial Radio Access (E-UTRA); Study on Minimization of Drive-Tests in Next Generation Networks, 3GPP Specific Detail, http://www.3gpp.org/DynaReport/36805.htm.
Ericsson et al., Accessibility Measurements for MDT, 3GPP TSG-RAN WG2 #76, Oct. 14-18, 2011, Tdoc R2-116148, San Francisco, CA, USA.
Alcatel-Lucent, VLR SGs Paging Retry, SA WG2 Meeting #87, Oct. 10-14, 2011, S2-114636, Jeju, South Korea.
3GPP, 3rd Generation Partnership Project; Technical Specification Group Services and System Aspects; Service Accessibility (Release 11), 3GPP TS 22.011, Dec. 2011, V11.2.0, Sophia Antipolis, France.

Huawei et al., General Consideration of EAB in LTE, 3GPP TSG-RAN WG2 Meeting #75, Aug. 22-26, 2011, R2-113988, Athens, Greece.
Alcatel-Lucent et al.; RRC signalling design for Almost Blank Subframe patterns; 3GPP TSG-RAN WG2 Meeting #72; R2-106451; Nov. 15-19, 2010; Jacksonville, FL.
Huawei et al; Consideration on DRX in eICIC scenario; 3GPP TSG-RAN WG2 Meeting #73; R2-111021; Feb. 21-25, 2011; Taipei.
Research in Motion UK Limited; UE power saving for eICIC; 3GPP TSG RAN WG2 Meeting #73; R2-111233; Feb. 21-25, 2011; Taipei, Taiwan.
3GPP; 3rd Generation Partnership Project; Technical Specification Group Radio Access Network Extending 850 MHz Study Item Technical Report (Release 9); 3GPP TR 37.806; V1 .10.0; Aug. 2011.
Huawei et al: "Remaining issue for accessibility", 3GPP Draft; R2-122457 Remaining Issue for Accessbility, 3rd Generation Partnership Project (3GPP), Mobile Competence Centre; 650, Route Des Lucioles ; F-06921 Sophia-Antipolis Cedex ; France, vol. RAN WG2, No. Prague, Czech Republic; May 21, 2012-May 25, 2012, May 15, 2012 (May 15, 2012), XP050607283.
3GPP TS 36.321 V8.2.0, Technical Specification Group Radio Access Network; Evolved Universal Terrestrial Radio Access (EUTRA) Medium Access Control (MAC) protocol specification (Release 8), section 5.1.1-5.1.4, May 2008, Jun. 17, 2008.
Juniper, "Overview of PDP contexts and Bearers", Nov. 16, 2011, retrived at http://www.juniper.net/techpubs/en_US/junosmobility11.2/topics/concept/gateways-mobility-bearer-overview.html, Nov. 16, 2011.
Telcoloewe, "PDP context vs. EPS Bearer", Jan. 28, 2010. https://telcoloewe.wordpress.com/201 0/01/28/pdp-context-vs-epsbearer/https://telcoloewe.wordpress.com/201 % 1 /28/pdp-co ntext -vs-eps-bearer/, Jan. 28, 2010.
3GPP TS 36.331 "3rd Generation Partnership Project; Technical Specification Group Radio Access Network; Evolved Universal Terrestrial Radio Access (E-UTRA); Radio Resource Control (RRC); Protocol specification (Release 10)" V10.4.0, Dec. 22, 2011.
Ericsson, "Introduction of CA Enhancements in MAC", R2-121988, 3GPP TSG-RAN WG2 Meeting #77bis, Jeju, Korea, Mar. 26-30, 2012, Apr. 18, 2012.
ETSI TS 36.321 V14.5.0 (Jan. 2018), LTE; Evolved Universal Terrestrial Radio Access (E-UTRA); Medium Access Control (MAC) protocol specification (3GPP TS 36.321 version 14.5.0 Release 14), Jan. 7, 2018.
Extended European Search Report dated Apr. 6, 2021, issued in European Application No. 21150615.9-1218.
Samsung, "Discussion on UP protocol stack options in inter-ENB Carrier Aggregation", 3GPP TSG-RAN WG2 Meeting #81bis, R2-131070, Apr. 5, 2013.
Motorola, "Layer-2 structure for LTE-A carrier aggregation", 3GPP TSG-RAN-WG2 Meeting #66 R2-093204, Apr. 28, 2009.
Chairman: "Notes"; May 11, 2011, pp. 1-84, XP050496185.
CATT: "Detail on SCell RACH Configuration", 3GPP TSG RAN WG2 Meeting #78, Prague, Czech Republic, May 21-25, 201215 May 2012, XP050607173, R2-122175.
Chinese Office Action dated Nov. 6, 2020, issued in Chinese Application No. 201710464369.1.
Korean Notice of Allowance dated Oct. 21, 2020, issued in Korean Application No. 10-2014-7031376.
Extended European Search Report dated Jan. 12, 2021, issued in European Application No. 20201347.0-1218.
Intel Corporation: "Enhancements in DRX operation", 3GPP Draft; R2-124974_TEI11_DRX-FINAL, 3rd Generation Partnership Project (3GPP), Mobile Competence Centre; 650, Route Des Lucioles; F-06921 Sophia-Antipolis Cedex; France, vol. RAN WG2, No. Bratislava, Slovakia; Oct. 8, 2012-Oct. 12, 2012, XP050666517, Sep. 28, 2012.
Ericsson et al: "CSI and SRS reporting at unexpected DRX state change", 3GPP Draft; R2-115438 CSI and SRS Reporting at Unexpected DRX State Change 3rd Generation Partnership Project (3GPP), Mobile Competence Centre; 650, Route Des Lucioles;

(56) References Cited

OTHER PUBLICATIONS

F-06921 Sophia-Antipolis Cedex; France, vol. RAN WG2, No. Zhuhai; XP050540889, Oct. 3, 2011.
Samsung: "Discussion on mandating CSI/SRS transmission during uncertain period", 3GPP Draft; R2-124687 Mandating CSI_SRS for 4 Subframes, 3rd Generation Partnership Project (3GPP), Mobile Competence Centre; 650, Route Des Lucioles; F-06921 Sophia-Antipolis Cedex; France, vol. RAN WG2, No. Bratislava, Slovakia; Oct. 8, 2012-Oct. 12, 2012, XP050666412, Sep. 28, 2012.
European Summons to Attend Oral Proceedings dated May 4, 2021, issued in European Application No. 12839782.5-1212.
Samsung, "Discussion on FGI bit handling for FDD/TDD dual mode UE", 3GPP TSG-RAN2 #75 meeting, Aug. 22-26, 2011(electronically published Aug. 16, 2011), R1-114177.
Clearwire, "E-UTRA capability handling for dual mode UEs (FDD/TDD)", 3GPP TSG-RAN Meeting #54, Berlin Germany, Dec. 6-9, 2011, RP-111618.
Clearwire, "Capability handling for dual mode UEs (FDDITDD)", 3GPP TSG-RAN Working Group Meeting #75bis, Ahuhai, China, Oct. 10-14, 2011, R2-115468 with a publicly available date of Oct. 7, 2011.
Samsung, "Report: [75#32] FGI bit handling for FDD/TDD dual mode UE", 3GPP TSG-RAN2 #75bis meeting, Oct. 10-14, 2011, Zhuhai, China, Tdoc, R2-115034.
3GPP TS 36.331 V9.0.0 (Sep. 2009); 3rd Generation Partnership Project; Technical Specification Group Radio Access Network; Evolved Universal Terrestrial Radio Access (E-UTRA) Radio Resource Control (RRC); Protocol specification (Release 9) pp. 76-77, 170-173 (Year: 2009).
3GPP TS 36.321 V9.3.0, 3rd Generation Partnership Project; Technical Specification Group Radio Access Network; Evolved Universal Terrestrial Radio Access (E-UTRA); Medium Access Control (MAC) protocol specification (Release 9), Jun. 2010.
ITRI, "Further analysis on RAN overload control mechanisms",3GPP Draft; R2-112197_Further Analysis on RAN Overload Control Mechanisms, 3rd Generation Partnership Project (3GPP), Mobile Competence Centre ; 650, Route Des Lucioles ; F-06921 Sophia-Antipolis Cedex; France, vol. RAN WG2, No. Shanghai, China; Apr. 11, 2011, XP050494576.
"3rd Generation Partnership Project; Technical Specification Group Radio Access Network; Evolved Universal Terrestrial Radio Access (E-UTRA); Multiplexing and channel coding (Release 10)", 3GPP Standard; 3GPP TS 36.212, 3rd Generation Partnership Project (3GPP), Mobile Competence Centre ; 650, Route Des Lucioles ; F-06921 Sophia-Antipolis Cedex ; France, vol. RAN WG1, No. V10.2.0, Jun. 21, 2011 (Jun. 21, 2011), pp. 1-78, XP050553365.
"3rd Generation Partnership Project; Technical Specification Group Radio Access Network; Evolved Universal Terrestrial Radio Access (E-UTRA); Physical layer procedures (Release 10)", 3GPP Standard; 3GPP TS 36.213, 3rd Generation Partnership Project (3GPP), Mobile Competence Centre ; 650, Route Des Lucioles ; F-06921 Sophia-Antipolis Cedex ; France, vol. RAN WG1, No. V10.3.0, Sep. 25, 2011 (Sep. 25, 2011), pp. 1-122, XP050553950.
European Notice of allowance dated Aug. 30, 2021, issued in European Application No. 19193176.5-1231.
European Communication dated Oct. 27, 2021, issued in European Application No. 12839782.5.
3GPP; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11); 3GPP TS 36.300; V11.1.0; Mar. 14, 2012.
Ericsson et al.; Limitation of PDCP SN and FMS-fields; 3GPP TSG-RAN WG2 #78; Tdoc R2-122651; May 15, 2012; Prague, Czech Republic.
Chinese Office Action with English translation dated Dec. 2, 2021; Chinese Appln. No. 201910248625.2.
3rd Generation Partnership Project; Technical Specification Group Radio Access Network; Evolved Universal Terrestrial Radio Access (E-UTRA); Medium Access Control (MAC) protocol specification (Release 10); 3GPP TS 36.321; V10.3.0; Sep. 2011; Valbonne, France1.
Huawei et al.; RACH failure handling on SCell; 3GPP TSG-RAN WG2 Meeting #77; R2-120059; Feb. 6-10, 2012; Dresden, Germany; XP050565266; published Jan. 31, 2012.
CATT; SCell RA failure; 3GPP TSG RAN WG2 Meeting #77; R2-120255; Feb. 6-10, 2012; Dresden, Germany; XP050565344; published Jan. 31, 2012.
European Notice of Allowance dated Feb. 15, 2022; European Appln. No. 12 839 782.5-1212.
European Search Report dated Mar. 11, 2022; European Appln. No. 21195342.7-1218.
Chinese Office Action with English translation dated Jan. 13, 2023; Chinese Appln. No. 201910248625.2.
Extended European Search Report dated Mar. 15, 2023; European Appln. No. 22215051.8-1218.
European Communication dated Feb. 17, 2023; European Appln. No. 21 195 342.7-1218.
European Communication dated Jan. 19, 2023; European Appln. No. 20 201 347.0-1218.
U.S. Notice of Allowance dated Mar. 22, 2023; U.S. Appl. No. 16/715,587.
U.S. Office Action dated Apr. 6, 2023; U.S. Appl. No. 17/200,364.
U.S. Office Action dated Apr. 24, 2023; U.S. Appl. No. 17/505,256.
Li et al.; Access Probability Aware Cell Reselection for Load Balancing; Proceedings of ICCTA2009; IEEE; 2009.
U.S. Office Action dated Dec. 28, 2022; U.S. Appl. No. 16/715,587.
U.S. Office Action dated Feb. 9, 2023; U.S. Appl. No. 17/096,553.
U.S. Notice of Allowance dated Feb. 2, 2023; U.S. Appl. No. 17/548,324.
Chinese Office Action with English translation dated Sep. 28, 2022; Chinese Appln. No. 201910459535.8.
U.S. Office Action dated Jul. 14, 2023; U.S. Appl. No. 17/096,553.
U.S. Office Action dated Sep. 26, 2023; U.S. Appl. No. 17/200,364.

* cited by examiner

METHOD AND APPARATUS FOR SUPPORTING MULTIPLE FREQUENCY BANDS IN MOBILE COMMUNICATION SYSTEM

CROSS-REFERENCE TO RELATED APPLICATIONS

This application is a continuation application of prior Application Ser. No. 14/658,674, filed on Mar. 16, 2015, which will issue as U.S. Pat. No. 10,349,407 on Jul. 9, 2019, which is a continuation application of prior application Ser. No. 14/242,456, filed Apr. 1, 2014, which issued as U.S. Pat. No. 8,982,830 on Mar. 17, 2015; which is a continuation of U.S. patent application Ser. No. 13/589,729, filed on Aug. 20, 2012, which issued as U.S. Pat. No. 8,706,164 on Apr. 22, 2014; which claims the benefit under 35 U.S.C. § 119(e) of a U.S. Provisional applications Nos. 61/526,223 filed on Aug. 22, 2011, 61/531,185 filed on Sep. 6, 2011, 61/595,646 filed on Feb. 6, 2012, 61/612,950 filed on Mar. 19, 2012, 61/649,910 filed on May 21, 2012, and 61/653,026 filed on May 30, 2012 in the U.S. Patent and Trademark Office, and under 35 U.S.C. § 119(a) of a Korean patent application No. 10-2012-0087076 filed on Aug. 9, 2012 in the Korean Intellectual Property Office, the entire disclosures of each of which are hereby incorporated by reference.

BACKGROUND

1. Field

The present invention relates to a mobile communication system. More particularly, the present invention relates to a method and apparatus for supporting multiple frequency bands efficiently in a mobile communication system.

2. Description of the Related Art

Mobile communication systems were developed to provide subscribers with voice communication services while on the move. With the advancement of communications technologies, the mobile communication systems have evolved to support high speed data communication services as well as the standard voice communication services. Recently, as one of the next generation mobile communication systems, Long Term Evolution Advanced (LTE-A) is being standardized by the 3rd Generation Partnership Project (3GPP). LTE-A is a technology designed to provide high speed packet-based communication of up to 100 Mbps.

Several schemes for LTE-A are being discussed including one scheme for reducing the number of nodes located in a communication path by simplifying a configuration of the network, and another scheme for maximally approximating wireless protocols to wireless channels.

Meanwhile, unlike voice service, a data service is provided on a resource determined according to an amount of data to be transmitted and channel conditions. Accordingly, the wireless communication system, especially for cellular communication, is provided with a scheduler that manages transmission resource allocation in consideration of a needed resource amount, channel conditions, amount of data, etc. This is the case with the LTE-A system as the next generation mobile communication system, and in this case the scheduler is located at a base station and manages the transmission resource allocation.

In LTE-A Release-11, a new frequency band that overlaps a legacy frequency band is added. Although the frequency bands are used in different areas, a roaming terminal should be capable of operating on both of the overlapped frequency bands.

Therefore, a need exists for a technique for supporting a roaming terminal that is capable of operating on both of the overlapped frequency bands.

The above information is presented as background information only to assist with an understanding of the present disclosure. No determination has been made, and no assertion is made, as to whether any of the above might be applicable as prior art with regard to the present invention.

SUMMARY

Aspects of the present invention are to address the above-mentioned problems and/or disadvantages and to provide at least the advantages described below. Accordingly, an aspect of the present invention is to provide a method and for supporting multiple frequency bands efficiently in a mobile communication system.

Another aspect of the present invention is to provide a method and apparatus for informing a terminal of multiple frequency bands and determining a center frequency of an uplink frequency band, an uplink transmission power, and center frequencies of downlink bands of neighbor cells in a mobile communication system supporting multiple frequency bands.

In accordance with an aspect of the present invention, a method for supporting multiple frequency bands at a base station in a mobile communication system is provided. The method includes generating first system information including a frequency band indicator indicating a frequency band supported by the base station and an additional frequency band indicator indicating at least one frequency band supported by the base station, and broadcasting the first system information.

In accordance with another aspect of the present invention, a method for supporting multiple frequency bands at a terminal in a mobile communication system is provided. The method includes receiving a first system information including a frequency band indicator indicating a frequency band supported by a base station and an additional frequency band indicator indicating at least one frequency band supported by the base station, determining whether the frequency bands indicated by the frequency band indicator and the additional frequency band indicator includes one or more frequency bands supported by the terminal, and attempting, when the frequency bands indicated by the frequency band indicator and the additional frequency band indicator includes the one or more frequency bands supported by the terminal, access to the base station.

In accordance with another aspect of the present invention, a base station supporting a plurality of frequency bands in a mobile communication system is provided. The base station includes a transceiver which transmits and receives signals to and from a terminal, and a controller which controls generating a first system information including a frequency band indicator indicating a frequency band supported by the base station and an additional frequency band indicator indicating at least one frequency band supported by the base station and broadcasting the first system information.

In accordance with still another aspect of the present invention, a terminal for supporting a plurality of frequency bands in a mobile communication system is provided. The terminal includes a transceiver which transmits and receives signals to and from a base station, and a controller which controls receiving a first system information including a frequency band indicator indicating a frequency band supported by a base station and an additional frequency band indicator indicating at least one frequency band supported by the base station, determining whether the frequency bands indicated by the frequency band indicator and the additional frequency band indicator includes one or more frequency bands supported by the terminal, and attempting, when the frequency bands indicated by the frequency band indicator and the additional frequency band indicator includes the one or more frequency bands supported by the terminal, access to the base station.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention relate to a method and apparatus for supporting multiple frequency bands efficiently in a mobile communication system. The present disclosure proposes a method for informing a terminal of multiple frequency bands and determining a center frequency of an uplink frequency band, an uplink transmission power, and center frequencies of downlink bands of neighbor cells in a mobile communication system supporting multiple frequency bands.

Figure 1:
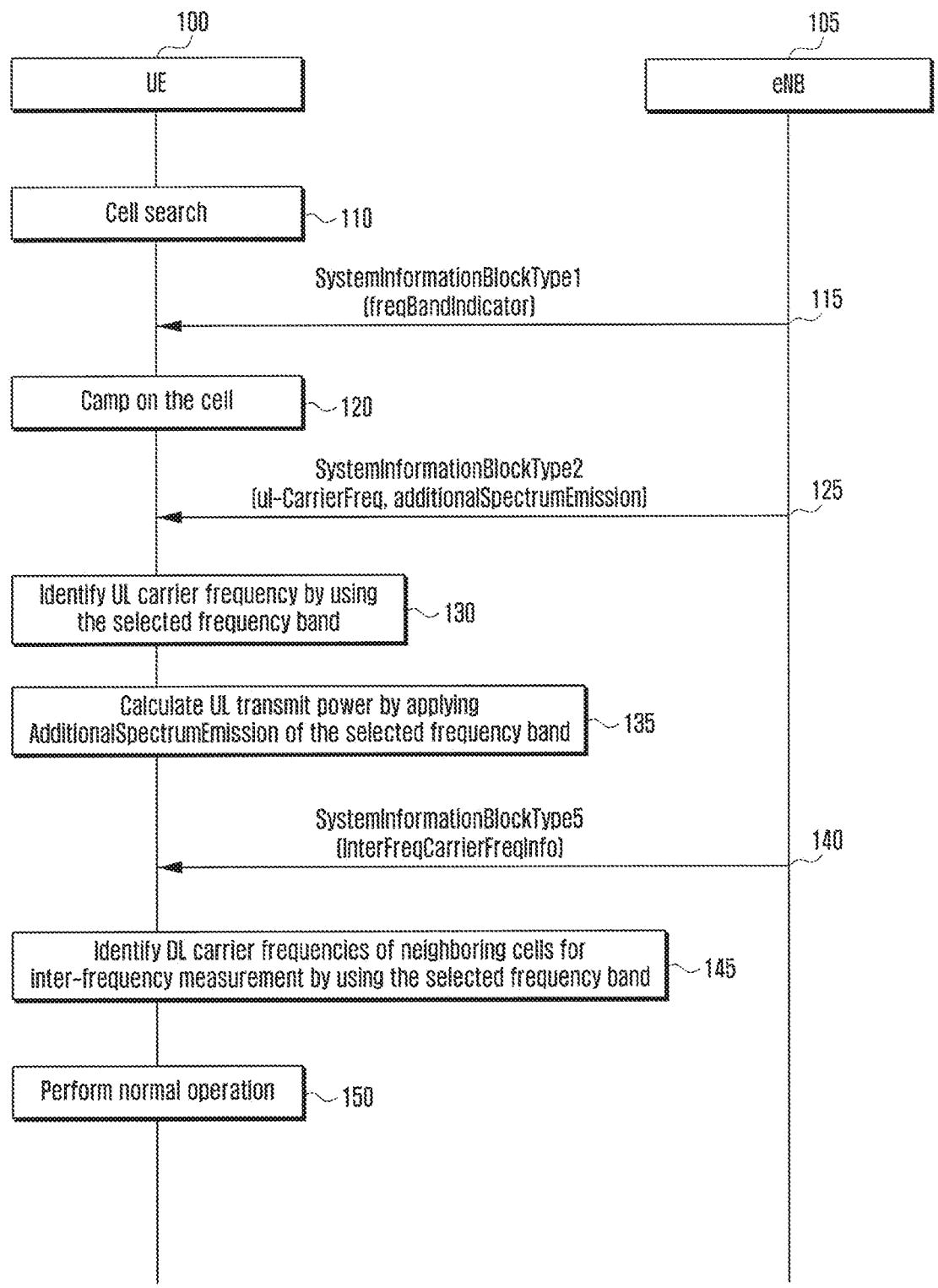
FIG. 1 is a signaling diagram illustrating a procedure for notifying a User Equipment (UE) of a frequency band and determining an uplink center frequency, an uplink transmission power, and downlink center frequencies of neighbor cells in a Long Term Evolution (LTE) system according to an exemplary embodiment of the present invention.

Prior to the explanation of the exemplary embodiments of the present invention, a brief description is made of the method for informing a User Equipment (UE) of the frequency band and determining uplink center frequency, uplink transmission power, and center frequencies of neighbor cells in the legacy Long Term Evolution (LTE) technology with reference to FIG. 1.

FIG. 1 is a signaling diagram illustrating a procedure for notifying a UE of a frequency band and determining an uplink center frequency, an uplink transmission power, and downlink center frequencies of neighbor cells in an LTE system according to an exemplary embodiment of the present invention.

Referring to FIG. 1, the UE 100 performs cell searching to discover a cell to camp on at step 110. Afterward, if the UE 100 is to establish a connection, the UE 100 makes a request to the cell to which it has camped for service.

If a cell having an appropriate signal strength is found, the UE 100 receives SystemInformationBlockType1 (SIB1) (hereinafter, interchangeably recited with the term 'first system information') broadcast by an evolved Node B (eNB) 105 of the corresponding cell at step 115. The SIB1 includes a freqBandIndicator Information Element (IE) (hereinafter, interchangeably recited with the term 'frequency band indicator'). This IE indicates the frequency band used in the cell. The IE is set to a value selected in the range from 1 to 64, and each value indicates the operating frequency bands specified in the LTE standard.

Table 1 shows the operating frequency bands of LTE specified in the LTE standard TS36.101. The leftmost column of Table 1 matches the value indicated by the IE, and the frequency bands corresponding to each indication value are shown in the right columns. The UE 100 determines a cell it camps on based on the frequency band information of the SIB1.

TABLE 1

Evolved-Universal Terrestrial Radio Access (E-UTRA) operating bands

| E-UTRA Operating Band | Uplink (UL) operating band Base Station (BS) receive UE transmit FUL_low-FUL_high | Downlink (DL) operating band BS transmit UE receive FDL_low-FDL_high | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 61 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |

NOTE 1:
Band 6 is not applicable

If the UE 100 supports the operating frequency indicated in the frequencyBandIndicator IE and if the corresponding frequency band is authenticated, the UE 105 determines to camp on the corresponding cell at step 120. At this time, the E-UTRA Cell IDentifier (ID) and Tracking Area Code (TAC) acquired from the SIB1 is delivered to a higher layer of the UE 105.

Otherwise, if it is not possible to camp on the cell, the UE 105 performs the cell searching process again to discovery another cell. As a consequence, if a cell to camp on is found, the UE 105 receives SIB2 (hereinafter, interchangeably recited with the term 'second system information) from the eNB 105 at step 125.

The SIB2 includes a UL-CarrierFreq IE (hereinafter, interchangeably recited with the term 'uplink carrier frequency') and an additionalSpectrumEmission IE (hereinafter, interchangeably recited with the term 'additional spectrum emission'). The information included in SIB2 is at least one value used for calculating uplink center frequency and uplink transmission power.

The UE 100 calculates the uplink center frequency in the frequency band at step 130. The uplink center frequency is calculated by using Equation (1):

$$F_{UL} = F_{UL\_low} + 0.1(N_{UL} - N_{offs-UL}) \quad \text{Equation (1)}$$

In Equation (1), NUL denotes a UL-CarrierFreq IE value included in SIB2 and matches to an Absolute Radio Frequency Channel Number (ARFCN). The ARFCN is a value in the range from 0 to 65535 and is used to acquire the uplink and downlink center frequencies. FUL_low denotes the lowest uplink frequency of the selected frequency band, and NOffs-UL and FUL_low are defined in the LTE standard TS36.101.

Table 2 shows the NOffs-UL and FUL_low values applicable per operating frequency band. In order to calculate the center frequency in uplink, the operating frequency band should be known.

TABLE 2

E-UTRA channel numbers

| E-UTRA Operating Band | Downlink | | | Uplink | | |
|---|---|---|---|---|---|---|
| | FDL_low (MHz) | NOffs-DL | Range of NDL | FUL_low (MHz) | NOffs-UL | Range of NUL |
| 1 | 2110 | 0 | 0-599 | 1920 | 18000 | 18000-18599 |
| 2 | 1930 | 600 | 600-1199 | 1850 | 18600 | 18600-19199 |
| 3 | 1805 | 1200 | 1200-1949 | 1710 | 19200 | 19200-19949 |
| 4 | 2110 | 1950 | 1950-2399 | 1710 | 19950 | 19950-20399 |
| 5 | 869 | 2400 | 2400-2649 | 824 | 20400 | 20400-20649 |
| 6 | 875 | 2650 | 2650-2749 | 830 | 20650 | 20650-20749 |
| 7 | 2620 | 2750 | 2750-3449 | 2500 | 20750 | 20750-21449 |
| 8 | 925 | 3450 | 3450-3799 | 880 | 21450 | 21450-21799 |
| 9 | 1844.9 | 3800 | 3800-4149 | 1749.9 | 21800 | 21800-22149 |
| 10 | 2110 | 4150 | 4150-4749 | 1710 | 22150 | 22150-22749 |
| 11 | 1475.9 | 4750 | 4750-4949 | 1427.9 | 22750 | 22750-22949 |
| 12 | 729 | 5010 | 5010-5179 | 699 | 23010 | 23010-23179 |
| 13 | 746 | 5180 | 5180-5279 | 777 | 23180 | 23180-23279 |
| 14 | 758 | 5280 | 5280-5379 | 788 | 23280 | 23280-23379 |
| ... | | | | | | |

TABLE 2-continued

E-UTRA channel numbers

| E-UTRA Operating Band | Downlink | | | Uplink | | |
|---|---|---|---|---|---|---|
| | FDL_low (MHz) | NOffs-DL | Range of NDL | FUL_low (MHz) | NOffs-UL | Range of NUL |
| 17 | 734 | 5730 | 5730-5849 | 704 | 23730 | 23730-23849 |
| 18 | 860 | 5850 | 5850-5999 | 815 | 23850 | 23850-23999 |
| 19 | 875 | 6000 | 6000-6149 | 830 | 24000 | 24000-24149 |
| 20 | 791 | 6150 | 6150-6449 | 832 | 24150 | 24150-24449 |
| 21 | 1495.9 | 6450 | 6450-6599 | 1447.9 | 24450 | 24450-24599 |
| 22 | 3510 | 6600 | 6600-7399 | 3410 | 24600 | 24600-25399 |
| 23 | 2180 | 7500 | 7500-7699 | 2000 | 25500 | 25500-25699 |
| 24 | 1525 | 7700 | 7700-8039 | 1626.5 | 25700 | 25700-26039 |
| 25 | 1930 | 8040 | 8040-8689 | 1850 | 26040 | 26040-26689 |
| 26 | 859 | 8690 | 8690-9039 | 814 | 26690 | 26690-27039 |
| ... | | | | | | |
| 33 | 1900 | 36000 | 36000-36199 | 1900 | 36000 | 36000-36199 |
| 34 | 2010 | 36200 | 36200-36349 | 2010 | 36200 | 36200-36349 |
| 35 | 1850 | 36350 | 36350-36949 | 1850 | 36350 | 36350-36949 |
| 36 | 1930 | 36950 | 36950-37549 | 1930 | 36950 | 36950-37549 |
| 37 | 1910 | 37550 | 37550-37749 | 1910 | 37550 | 37550-37749 |
| 38 | 2570 | 37750 | 37750-38249 | 2570 | 37750 | 37750-38249 |
| 39 | 1880 | 38250 | 38250-38649 | 1880 | 38250 | 38250-38649 |
| 40 | 2300 | 38650 | 38650-39649 | 2300 | 38650 | 38650-39649 |
| 41 | 2496 | 39650 | 39650-41589 | 2496 | 39650 | 39650-41589 |
| 42 | 3400 | 41590 | 41590-43589 | 3400 | 41590 | 41590-43589 |
| 43 | 3600 | 43590 | 43590-45589 | 3600 | 43590 | 43590-45589 |

Next, the UE 100 calculates the uplink transmission power using the additionalSpectrumEmission IE at step 135. This IE is used to derive an Additional Maximum Power Reduction (A-MPR) value used for calculating uplink transmission power along with the operating frequency band. The relationship of A-MPR according to the additionSpectrumEmission IE is specified in the LTE standard TS36.101 as shown in Table 3.

The leftmost column of Table 3 contains the NS values indicating additionSpectrumEmission IE values, e.g., if additionalSpectrumEmission is 1, this indicates NS_01 and, if 3, this indicates NS_03.

The maximum transmission power 1 of a certain serving cell c PCMAX,c is determined by Formula (2), and the highest value of the maximum transmission power 1 of the serving cell c PCMAX_H,c is determined by Equation (3),

TABLE 3

A-MPR

| Network Signaling value | Requirements (sub-clause) | E-UTRA Band | Channel bandwidth (MHz) | Resources Blocks (NRB) | A-MPR (dB) |
|---|---|---|---|---|---|
| NS_01 | 6.6.2.1.1 | Table 5.5-1 | 1.4, 3, 5, 10, 15, 20 | Table 5.6-1 | NA |
| NS_03 | 6.6.2.2.1 | 2, 4, 10, 23, 25, 35, 36 | 3 | >5 | ≤1 |
| | | | 5 | >6 | ≤1 |
| | | | 10 | >6 | ≤1 |
| | | | 15 | >8 | ≤1 |
| | | | 20 | >10 | ≤1 |
| NS_04 | 6.6.2.2.2 | 41 | 5 | >6 | ≤1 |
| | | | 10, 15, 20 | See Table 6.2.4-4 | |
| NS_05 | 6.6.3.3.1 | 1 | 10, 15, 20 | ≥50 | ≤1 |
| NS_06 | 6.6.2.2.3 | 12, 13, 14, 17 | 1.4, 3, 5, 10 | Table 5.6-1 | n/a |
| NS_07 | 6.6.2.2.3 6.6.3.3.2 | 13 | 10 | Table 6.2.4-2 | Table 6.2.4-2 |
| NS_08 | 6.6.3.3.3 | 19 | 10, 15 | >44 | ≤3 |
| NS_09 | 6.6.3.3.4 | 21 | 10, 15 | >40 >55 | ≤1 ≤2 |
| NS_10 | | 20 | 15, 20 | Table 6.2.4-3 | Table 6.2.4-3 |
| NS_11 | 6.6.2.2.1 | 23[1] | 1.4, 3, 5, 10 | Table 6.2.4-5 | Table 6.2.4-5 |
| ... | | | | | |
| NS_32 | — | — | — | — | — |

Note 1:
Applies to the lower block of Band 23, i.e., a carrier placed in the 2000-2010 MHz region.

and the lowest value of the maximum transmission power 1 of the service cell c PCMAX_L,c is determined by Equation (4):

$$PCMAX\_L,c \leq PCMAX,c \leq PCMAX\_H,c \quad \text{Equation (2)}$$

$$PCMAX\_H,c = \text{MIN}\{PEMAX,c, PPowerClass\} \quad \text{Equation (3)}$$

$$PCMAX\_L,c = \text{MIN}\{PEMAX,c\text{-}TC,c, PCMAX\_H,c\text{-}MPR\ c\text{-}A\text{-}MPR\ c\text{-}TC,c\} \quad \text{Equation (4)}$$

where, PEMAX,c, ΔTC,c, PPowerClass, MPRc, and A-MPRc are specified in the 3GPP standard TS36.101.

PEMAX,c denotes a maximum allowed uplink transmission power in the service cell c which is transmitted from the eNB 105 to the UE 100. PPowerClass denotes the nominal maximum transmission power determined according to the physical characteristics of the UE 100. The power class of the UE 100 is determined at the manufacturing stage, and the UE 100 reports its power class to the network using a predetermined Radio Resource Control (RRC) message.

ΔTC,c, MPRc, AND A-MPRc are parameters for defining a value that is capable of adjusting the maximum transmission power of the UE 100 in the serving cell c to meet the unintended emission of interference to the neighbor channel. MPRc is a value determined according to the transmission amount (i.e., bandwidth) and modulation scheme. A-MPRc is a value determined according to the frequency band of uplink transmission, geographical characteristic, uplink transmission bandwidth, etc. A-MPRc is used for preparing the case where the frequency band is especially sensitive to the spurious emissions according to geographical characteristics and frequency band characteristics. In a case where the uplink transmission is performed at a boundary of the frequency band, ΔTC,c is used to allow for additional transmission power adjustment. If the uplink transmission is performed at a lowest 4 MHz or a highest 4 MHz of a certain frequency band, the UE 100 sets ΔTC,c to 1.5 DB, and otherwise, sets ΔTC,c to 0.

Referring back to FIG. 1, the UE 100 receives SIB5 at step 140. The SIB5 includes InterFreqCarrierFreqInfo IE (hereinafter, interchangeably recited with the term 'neighbor frequency information'). According to the number of neighbor E-UTRAs, multiple InterFreqCarrierFreqInfo IEs can be included. Each IE matches to a neighbor E-UTRA cell. This IE is used to derive the downlink center frequency of the neighbor E-UTRA cell to perform inter-frequency measurement.

The UE calculates the downlink center frequency of the neighbor E-UTRA cell to perform the inter-frequency measurement at step 145. The downlink center frequency of the neighbor E-UTRA cell is calculated according to Equation (5).

$$FUL = FDL\_low + 0.1(NDL - NOffs\text{-}DL) \quad \text{Equation (5)}$$

where NDL denotes dl-CarrierFreq IE value included in the interFreqCarrierFreqInfo and matches to ARFCN. The FDL_ low denotes the lowest downlink frequency of the selected frequency band. NOffs and FDL_low are defined in Table 2.

Afterward, the UE 100 performs normal operation at step 150. For example, the UE 100 is capable of performing one of cell reselection, paging message reception monitoring, system information change monitoring, RRC connection configuration, and data communication, as needed.

In LTE-A release 11, a new frequency band having an operating frequency overlapped with the operating frequency of the legacy frequency band. For example, band 26 in Table 1 is the frequency band newly added in Rel-11 and its operating frequency is overlapped with those indicated by legacy bands 5, 18, and 19.

Figure 2:
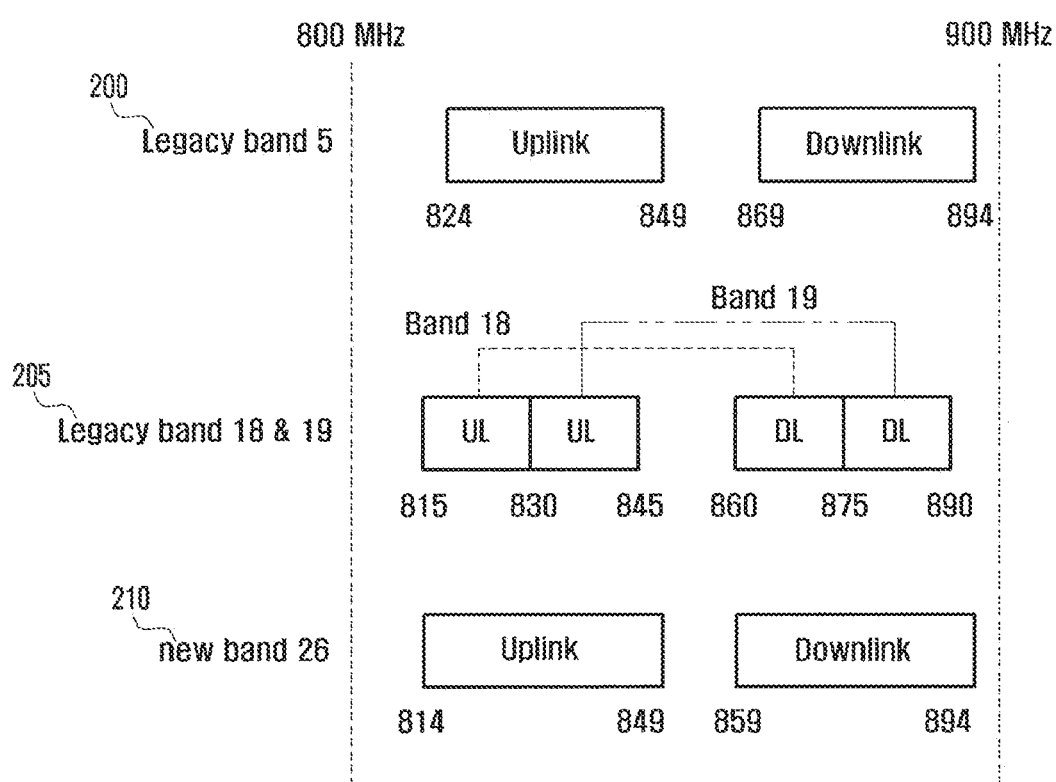
FIG. 2 is a diagram illustrating a configuration of frequency band of band 26 on which a legacy frequency band and a newly added frequency band are overlapped according to an exemplary embodiment of the present invention.

FIG. 2 is a diagram illustrating a configuration of frequency band of band 26 on which a legacy frequency band and a newly added frequency band are overlapped accordingly to an exemplary embodiment of the present invention.

Referring to FIG. 2, band 26 210 is composed of an uplink in the range of 814~849 MHz and a downlink in the range of 859~894 MHz. Meanwhile, legacy band 5 200 and legacy bands 18 and 19 205 exist in the range of 800~900 MHz so as to be overlapped with the frequency band of the newly added band 26 210. Although these frequency bands are used in different areas, it is desired for a roaming UE to support all of these overlapped frequencies. In the present exemplary embodiment, when a specific operating frequency belongs to multiple frequency bands, the eNB notifies that the multiple frequency bands are supportable. In this case, the eNB notifies of the legacy frequency bands in the legacy freqBandIndicator IE while the new frequency bands are notified in a newly defined IE. Unlike the legacy freqBandIndicator indicating only one frequency band, the newly defined IE is capable of indicating one or more frequency bands. In the present exemplary embodiment, this new IE is referred to as ExtfreqBandIndicator or MultiBandInfoList (hereinafter, interchangeably recited with the term 'added frequency band indicator').

If there is at least one frequency band among the frequency bands indicated in the freqBandIndicator IE and the ExtfreqBandIndicator IE provided in a specific cell, the UE determines that the cell is accessible.

More particularly, when there are two or more frequency bands indicated in the ExtfreqBandIndicator, the UE selects one of the frequency bands according to a predetermined rule. If the UE supports multiple frequency bands, there can be UE-preferable priorities of frequency bands in view of the eNB or network. For example, if the eNB supports band X and band Y, the UE supporting both bands X and Y may prefer the band X to the band Y. Accordingly, the UE and the eNB share a predetermined rule to indicate the priority implicitly for selecting one of plural frequency bands. For example, the eNB arranges the frequency bands in UE selection priority in the ExtfreqBandIndicator such that, if there are multiple UE-supportable frequency bands among the frequency bands indicated in the ExtfreqBandIndicator, the UE selects the supportable-frequency band arranged first among the supportable frequency bands.

Figure 3:
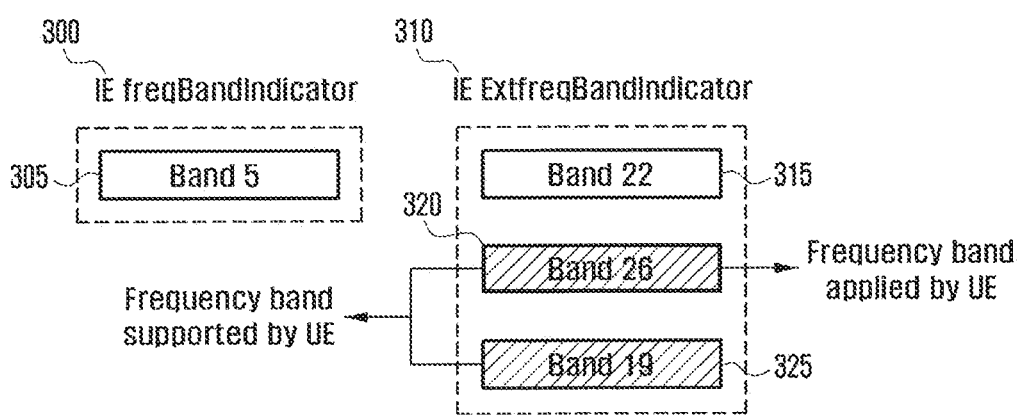
FIG. 3 is a signaling diagram illustrating a procedure for selecting one of frequency bands indicated by an extfreqBandIndicator Information Element (IE) in a method according to an exemplary embodiment of the present invention.

FIG. 3 is a signaling diagram illustrating a procedure for selecting one of frequency bands indicated by an extfreqBandIndicator IE in a method according to an exemplary embodiment of the present invention. As described above, the extfreqBandIndicator IE is capable of including information on the multiple frequency bands.

Referring to FIG. 3, it is assumed that a freqBandIndicator 300 includes a band 5 305 as one of the legacy frequency bands and an extfreqBandIndicator 310 includes a plurality frequency bands of band 22 315, band 26 320, and band 19 325 filled in sequence. From the frequency band indicators, it is possible to know that the corresponding cell supports band 5, band 22, band 26, and band 19.

Assuming that two frequency bands of band 26 and band 19 are supported as indicated in the extfreqBandIndicator IE, the UE selects one of the two supportable frequency bands. According to an exemplary embodiment of the present invention, the frequency band included first in the extfreqBandIndicator IE is selected for use by the UE.

Although the UE selects a new frequency band, the uplink center frequency and the downlink center frequency of the neighbor E-UTRA cell are derived from the values indicated in the legacy freqBandIndicator IE and InterFreqCarrierFreqInfo IE. This is because there is no need to increase the signaling overhead unnecessarily by defining as many new IEs as the frequency bands supported by the cell, since each of the corresponding serving cell and the neighbor cell has one center frequency in each of uplink and downlink despite the serving cell supporting multiple frequency bands. The present exemplary embodiment also proposes a method for deriving the uplink center frequency using the Default distance specified in 3GPP standard TS36.101.

For the additionalSpectrumEmission IE broadcast in SIB2, a new IE is defined for the new frequency band. This IE is band-specific, and it is not possible to reuse the related-art value for the new band. In the present exemplary embodiment, the new IE is referred to as extAdditionalSpectrumEmission (hereinafter, interchangeably recited with the term 'extra additional spectrum emission'). The number of new IEs matches the number of new frequency bands supported by the cell. For example, if the cell supports two new frequency bands, a total of two extAdditionalSpectrumEmission IEs are generated for the respective bands. In a case where multiple extAdditionalSpectrumEmission IEs are configured for the respective frequency bands, these IEs match the frequency bands filled in the ExtfreqBandIndicator in sequence.

Figure 4:
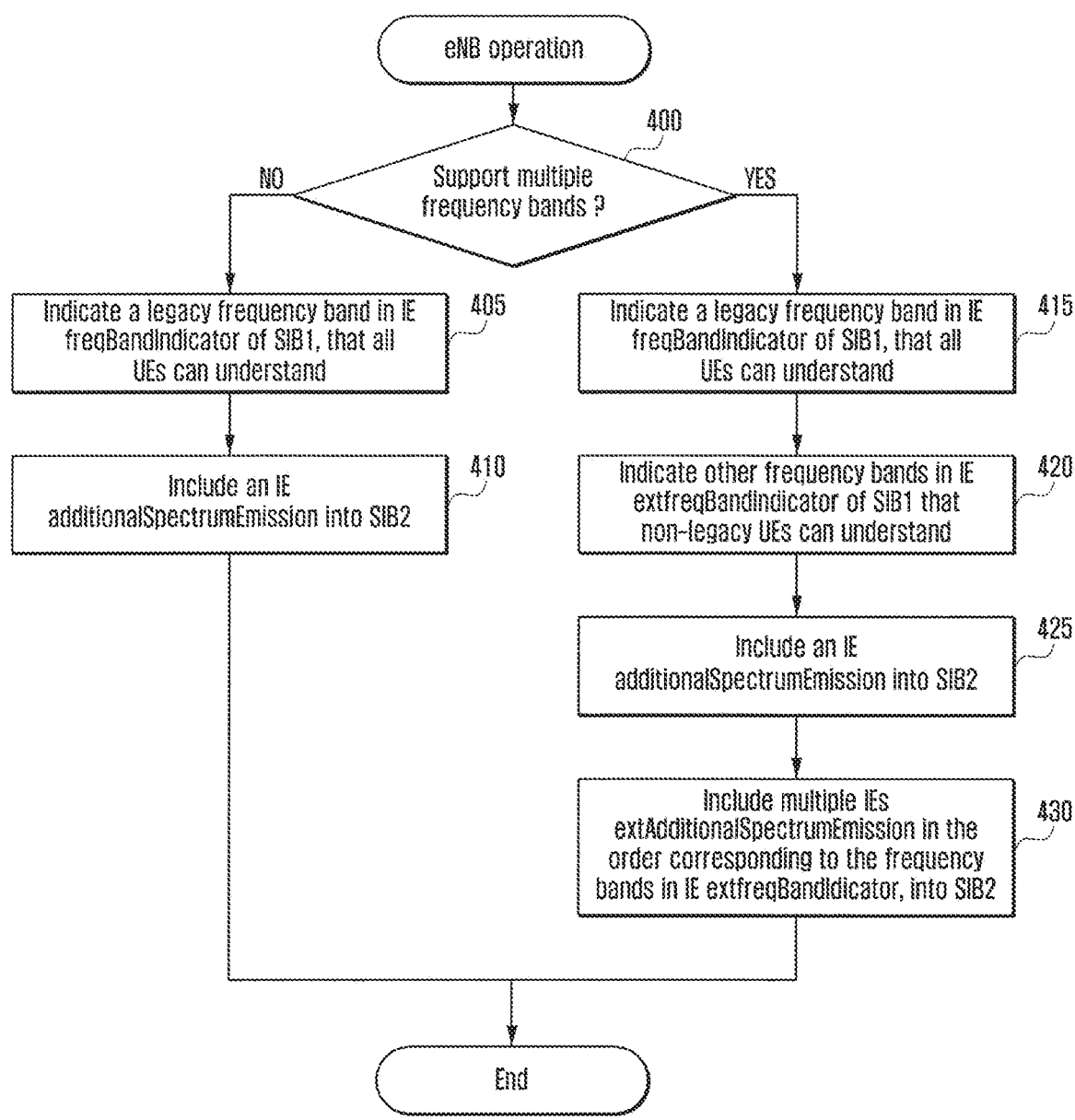
FIG. 4 is a flowchart illustrating the an evolved Node B (eNB) operation of a method according to an exemplary embodiment of the present invention.

FIG. 4 is a flowchart illustrating an eNB operation of a method according to an exemplary embodiment of the present invention.

FIG. 4 is directed to the eNB operation for filling the SIB1 and SIB2 with the multiple operating frequency bands and the extAdditionalSpectrumEmission IEs.

Referring to FIG. 4, the eNB determines whether it supports multiple operating frequency bands at step 400. If the eNB does not support multiple operating frequency bands, the eNB configures the freqBandIndicator IE of the SIB1, which all UEs can understand, to indicate a legacy frequency band as in the related-art method at step 405. The eNB includes the additionalSpectrumEmission value corresponding to the frequency band into the SIB2 at step 410. Afterward, the eNB broadcasts the generated SIBs (not shown).

Otherwise if the eNB supports multiple operating frequency bands, the eNB configures the freqBandIndicator IE of the SIB1, which all UEs can understand, to indicate a legacy frequency band at step 415. Next, the eNB configures an extfreqBandIndicator, which only the non-legacy UEs can understand, to indicate one or more frequency bands with the exception of the frequency band indicated by the freqBandIndicator IE at step 420.

The eNB includes the additionalSpectrumEmission value to be applied to the legacy frequency band indicated in the freqBandIndicator into the SIB2 at step 425. Next, the eNB includes the extAdditionalSpectrumEmission IE values corresponding to the frequency bands indicated in the extfreqBandIndicator IE into the SIB2 in the same sequence as the frequency bands included in the extfreqBandIndicator IE at step 430.

Afterward, the eNB broadcasts the generated SIBs (not shown).

Figure 5:
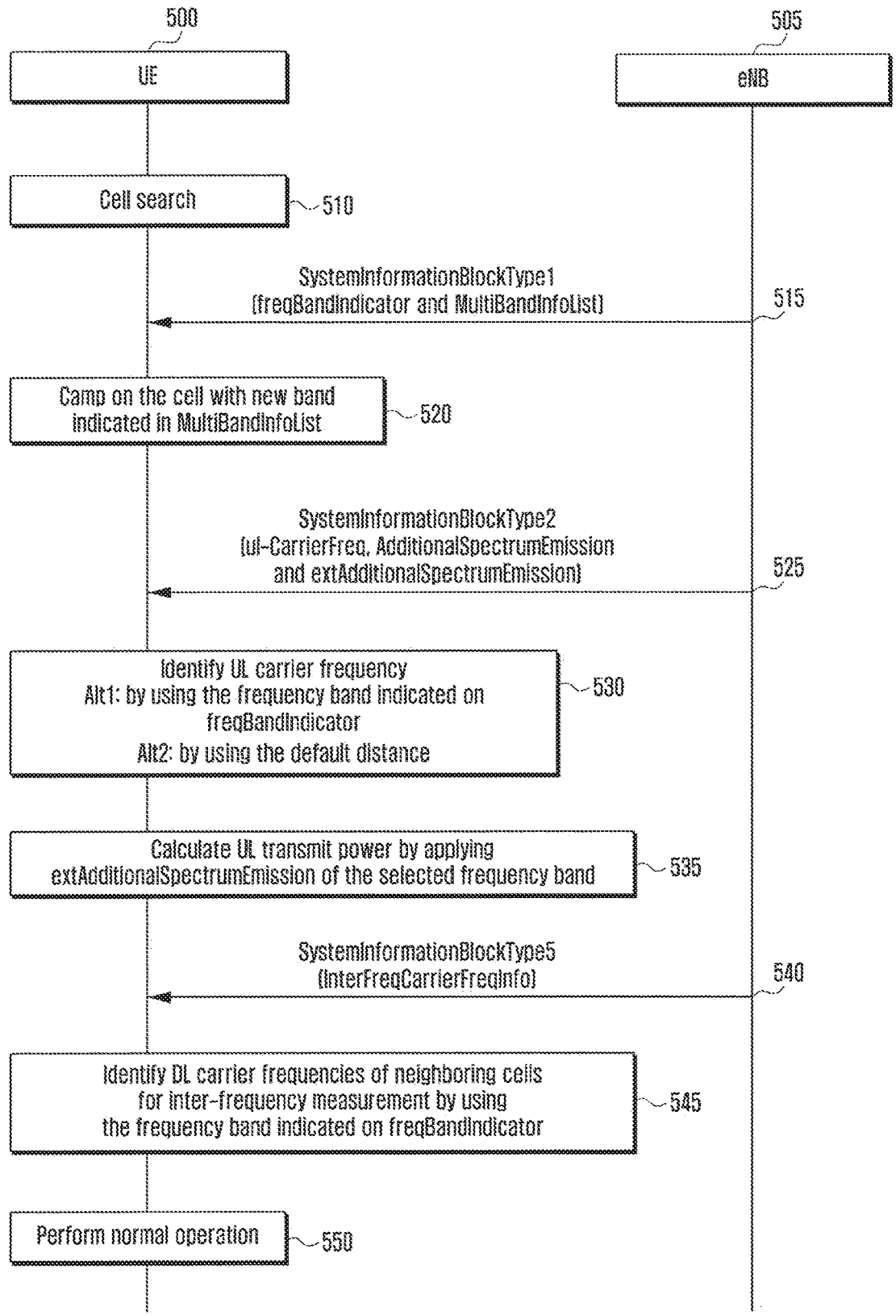
FIG. 5 is a flowchart illustrating eNB and UE operations of a method according to an exemplary embodiment of the present invention.

FIG. 5 is a flowchart illustrating eNB and UE operations of a method according to an exemplary embodiment of the present invention.

The UE 500 performs cell searching to discover a cell to which it camps on at step 510. If a cell having an appropriate signal strength is found, the UE 500 receives the SystemInformationBlockType1 (SIB1) broadcast by the eNB 505 of the corresponding cell at step 515.

In this case, the eNB 505 supports multiple frequency bands. Accordingly, the SIB1 received by the UE 500 includes both the freqBandIndicator and ExtfreqBandIndicator. These IEs indicate the frequency bands supported by the cells.

The UE 500 can be categorized into one of a legacy UE and a non-legacy UE. The legacy UE can decode and understand only the freqBandIndicator IE, and the non-legacy UE can decode and understand the ExtfreqBandIndicator IE as well as freqBandIndicator IE. Accordingly, the legacy UE determines whether it supports the frequency band indicated in the freqBandIndicator IE, and the non-legacy UE, if it supports at least one of the frequency bands indicated in the freqBandIndicator and ExtfreqBandIndicator IEs, determines that it is accessible to the cell.

If the UE 500 is accessible to a certain cell, this means that the access to the cell is not barred in view of the frequency band and thus the UE 500 takes a subsequent action continuously to determine whether the access to the cell is forbidden from another view point, e.g., inspecting the status of the corresponding cell using the cell ID and PLMN ID. If the UE 500 inspects the status of the cell, this case is described below.

That is, if there is no frequency band supported by the UE 500 among the frequency bands indicated in the IEs, the UE 500 determines that the access to the corresponding cell is barred. Otherwise, if there is two or more frequency bands supported by the UE 500 among the frequency bands indicated in the ExtfreqBandIndicator IE, the UE 500 selects the frequency band included first in the ExtfreqBandIndicator IE.

If the UE 500 supports a certain frequency band indicated in the ExtfreqBandIndicator IE and if the corresponding frequency band is authenticated, the UE 500 determines that it can access the corresponding cell in view of the frequency band at step 520. If the UE 500 supports the frequency band indicated in the freqBandIndicator IE, the UE 500 performs the procedure depicted in FIG. 1.

If the UE 500 determines that it cannot camp on the corresponding cell, the UE 500 performs the cell searching process again to discover another cell. If the UE 500 determines that it can access the corresponding cell in view of frequency band, the UE 500 checks the status of the cell by referencing the TAC and Cell ID of the corresponding cell. If the UE 500 checks the status of the cell, this means that the UE 500 determines whether the access to the cell is barred by the operator. Typically, the operation can bar a certain UE 500 from accessing the cells belonged to a specific Tracking Area (TA).

If a TA Update (TAU) reject message is received from a Mobility Management Entity (MME) in the TAU procedure, the UE 500 adds the "TA to the forbidden TAs for roaming" list in a TAU attempt according to a Evolved Packet System (EPS) Mobility Management (EMM) cause value included in the message so as to forbid the UE 500 to perform unnecessary access attempts. Accordingly, the UE 500 checks the status of the corresponding cell using a TAC of the cell of the frequency band it supports as above so as to determine whether the access to the corresponding cell is forbidden.

The UE 500 receives SIB2 from the eNB 505 at step 525. The SIB2 includes ul-CarrierFreq IE, additionalSpectrumEmission IE, and extAdditionalSpectrumEmission IE.

These IEs are used for calculating uplink center frequency and uplink transmission power.

The UE 500 calculates the uplink center frequency of the frequency band at step 530. The present exemplary embodiment proposes two methods. The first is to calculate the uplink center frequency using Equation (1). In Equation (1), NUL denotes a UL-CarrierFreq IE value included in SIB2 and matches an ARFCN. FUL_low denotes the lowest uplink frequency of the selected frequency band, and NOffs-UL and FUL_low are defined in Table 2. The present exemplary embodiment is characterized in that, when retrieving NOffs-UL and FUL_low value in Table 2, an operating frequency band indicated in the freqBandIndicator IE is used other than the frequency band indicated in the ExtfreqBandIndicator IE.

If the UE 500 does not support the operating frequency band indicated in the freqBandIndicator IE, the UE 500 may not understand the ARFCN provided in the SIB2. In this case, the first method is not applicable. The second method derives the uplink center frequency by applying the default distance to the frequency band. The default distance is the frequency offset value between the center frequencies of the transmission and reception carriers per band and specified in the 3GPP standard TS36.101. Table 4 shows the details of the default distance specified in the TS36.101. For example, if the UE 500 uses band 26, the uplink center frequency is the value obtained by subtracting 45 MHz from the downlink center frequency. If a new frequency band is introduced afterward, the default distance for the new frequency band will be specified in a technical specification of the standard.

TABLE 4

Default UE TX-RX frequency separation

| E-UTRA Operating Band | TX-RX carrier center frequency separation |
| --- | --- |
| 1 | 190 MHz |
| 2 | 80 MHz |
| 3 | 95 MHz |
| 4 | 400 MHz |
| 5 | 45 MHz |
| 6 | 45 MHz |
| 7 | 120 MHz |
| 8 | 45 MHz |
| 9 | 95 MHz |
| 10 | 400 MHz |
| 11 | 48 MHz |
| 12 | 30 MHz |
| 13 | −31 MHz |
| 14 | −30 MHz |
| 17 | 30 MHz |
| 18 | 45 MHz |
| 19 | 45 MHz |
| 20 | −41 MHz |
| 21 | 48 MHz |
| 22 | 100 MHz |
| 23 | 180 MHz |
| 24 | −101.5 MHz |
| 25 | 80 MHz |
| 26 | 45 MHz |

Typically, it is a basic requirement that the downlink center frequency and uplink center frequency of a cell belongs to the same frequency band, and the distance between the downlink and uplink center frequencies may change depending on the cell. In order to support such a case, the eNB 505 broadcasts an ARFCN indicating the uplink center frequency. However, it may not be supported to configure the distance between the downlink and uplink center frequencies flexibly, but the default distance is applied to all cells. Accordingly, when the default distance is applied to a certain cell supporting multiple frequency bands, then eNB 505 signals only one ARFCN indicating the uplink center frequency and, if there is only one ARFCN indicating uplink center frequency, the UE 500 calculates the uplink center frequency using the ARFCN (when the UE 500 has selected the frequency band indicated by freqBandIndicator) or by applying the default distance (when the UE 500 has selected the frequency band indicated by ExtfreqBandIndicator). If the default distance is not applied to a certain cell supporting multiple frequency bands, the eNB 505 signals the ARFCN indicating the uplink center frequency per frequency band separately. Accordingly, the operation of the UE selected the frequency band indicated by the ExtfreqBandIndicator can be defined as follows.

If only one ARFCN indicating the uplink center frequency is signaled in the system information, the uplink center frequency is calculated by applying the default distance.

If multiple ARFCNs indicating uplink center frequencies are signaled in the system information, the uplink center frequency is calculated by applying the uplink ARFCN corresponding to the frequency band that has been selected.

The system information also includes the information on the uplink bandwidth. The number of uplink bandwidth information is always only one, and the UE 500 determines the uplink transmission resource in the corresponding cell by applying the only one uplink bandwidth information regardless whether the selected frequency band is the one indicated by the freqBandIndicator or the ExtfreqBandIndicator.

In another method, if one ARFCN indicating the uplink center frequency is signaled and if the frequency band indicated by the ExtfreqBandIndicator is selected, the UE 500 is capable of determining the uplink center frequency by applying the following rule.

If the UE 500 can understand the frequency band indicated by the freqBandIndicator and the ARFCN indicating the uplink center frequency, the UE 500 determines the uplink center frequency by applying the frequency band indicated by the freqBandIndicator and the ARFCN indicating the uplink center frequency despite the UE 500 having selected the frequency band indicated by the ExtfreqBandIndicator.

If the UE 500 cannot understand the frequency band indicated by the freqBandIndicator and the ARFCN indicating the uplink center frequency, the UE 500 calculates the uplink center frequency by applying the downlink center frequency of the current cell determined in the cell search process and the default distance of the frequency band selected in the ExtfreqBandIndicator. That is, the UE 500 calculates the uplink center frequency by subtracting the default distance defined for the selected frequency band from the downlink center frequency of the cell. For reference, if the uplink center frequency is calculated by applying the default distance, this means that the UE 500 determines the value obtained by subtracting the default distance defined for the UE-selected frequency band from the downlink center frequency recognized in the cell search process as the uplink center frequency throughout the present disclosure.

The UE 500 calculates the uplink transmission power using the extadditionalSpectrumEmission IE at step 535. When multiple extAdditionalSpectrumEmission IEs corresponding to the respective frequency bands exist, the UE 500 uses the extadditionalSpectrumEmission IE values corresponding to the frequency bands included in the ExtfreqBandIndicator in sequence. This IE is also used to derive A-MPR value used for calculating uplink transmission power value along with the operating frequency band. The relationship between the Additional-Maximum Power Reduction (A-MPR) and uplink transmission power value has been described above.

Next, the UE 500 receives SIB5 at step 540. The SIB5 includes InterFreqCarrierFreqInfo IE. The number of InterFreqCarrierFreqInfo IEs can configured as many as the number of neighbor E-UTRA cells. Each IE matches to a neighbor E-UTRA cell. This IE is used to derive the downlink center frequency of the neighbor E-UTRA cell to perform inter-frequency measurement.

The UE 500 calculates the downlink center frequency of the neighbor E-UTRA cell to perform inter-frequency measurement at step 545. The downlink center frequency of the neighbor E-UTRA cell is calculated according to Equation (5). In Equation (5), NDL denotes dl-CarrierFreq IE value included in the interFreqCarrierFreqInfo and matches to ARFCN. The FDL_low denotes the lowest downlink frequency of the selected frequency band. NOffs and FDL_low are defined in Table 2. The present exemplary embodiment is characterized in that, when retrieving NOffs-UL and FUL_low value in Table 2, an operating frequency band indicated in the freqBandIndicator IE is applied other than the frequency band indicated in the ExtfreqBandIndicator IE.

Afterward, the UE 500 starts normal operation at step 550. For example, the UE 500 is capable of performing one of the cell reselection, paging message reception monitoring, system information change monitoring, RRC connection configuration, and data communication, as needed.

Among the above-enumerated normal operations, the present exemplary embodiment proposes the cell reselection operation. That is, the present exemplary embodiment proposes the UE 500 operation for determining whether to take the E-UTRA frequencies configured with multiple frequency bands into consideration in SIB5.

The SIB5 is capable of including one or more E-UTRA frequency-related information and broadcast neighbor frequency information. The SIB5 includes the following information per E-UTRA frequency that is applied in cell reselection to the corresponding E-UTRAN frequency.

dl-CarrierFreq=ARFCN-ValueEUTRA q-RxLevMin, p-Max, t-ReselectionEUTRA, threshX-High, threshX-Low, cellReselectionPriority, etc., list of Frequency Bands (FBs) to which E-UTRAN frequencies, with the exception of the frequency band mapped to dl-CarrierFreq, belongs (hereinafter, additional FB list)

The UE 500 operates as follows in performing the interfrequency cell reselection to the frequency 1 as a certain E-UTRA frequency.

1) If the cell reselection priority of frequency 1 is higher than that of a current serving frequency, the UE 500 supports the frequency band mapped to dl-CarrierFreq of frequency 1. Otherwise, if the UE 500 does not support the frequency band, the UE 500 supports one of the frequency bands included in the additional FB list, and if the channel quality of the best cell among the cells belonging to the frequency 1 is equal to or higher than a predetermined threshold (threshX-High) and if the best cell is not access-barred, the UE 500 reselects the cell.

2) If the cell reselection priority of frequency 1 is lower than that of a current serving frequency, the UE 500 supports the frequency band mapped to dl-CarrierFreq of the frequency 1. Otherwise, if the UE 500 does not support the frequency band, the UE 500 supports one of the frequency bands included in the additional FB list. Also, if the channel quality of the best cell on the current serving frequency is equal to or less then threshX-Low, if the channel quality of the best cell among the cells belonged to frequency 1 is equal to or higher a than a predetermined threshold, and if the cell is not in access-barred state, the UE 500 selects the best cell.

Figure 6:
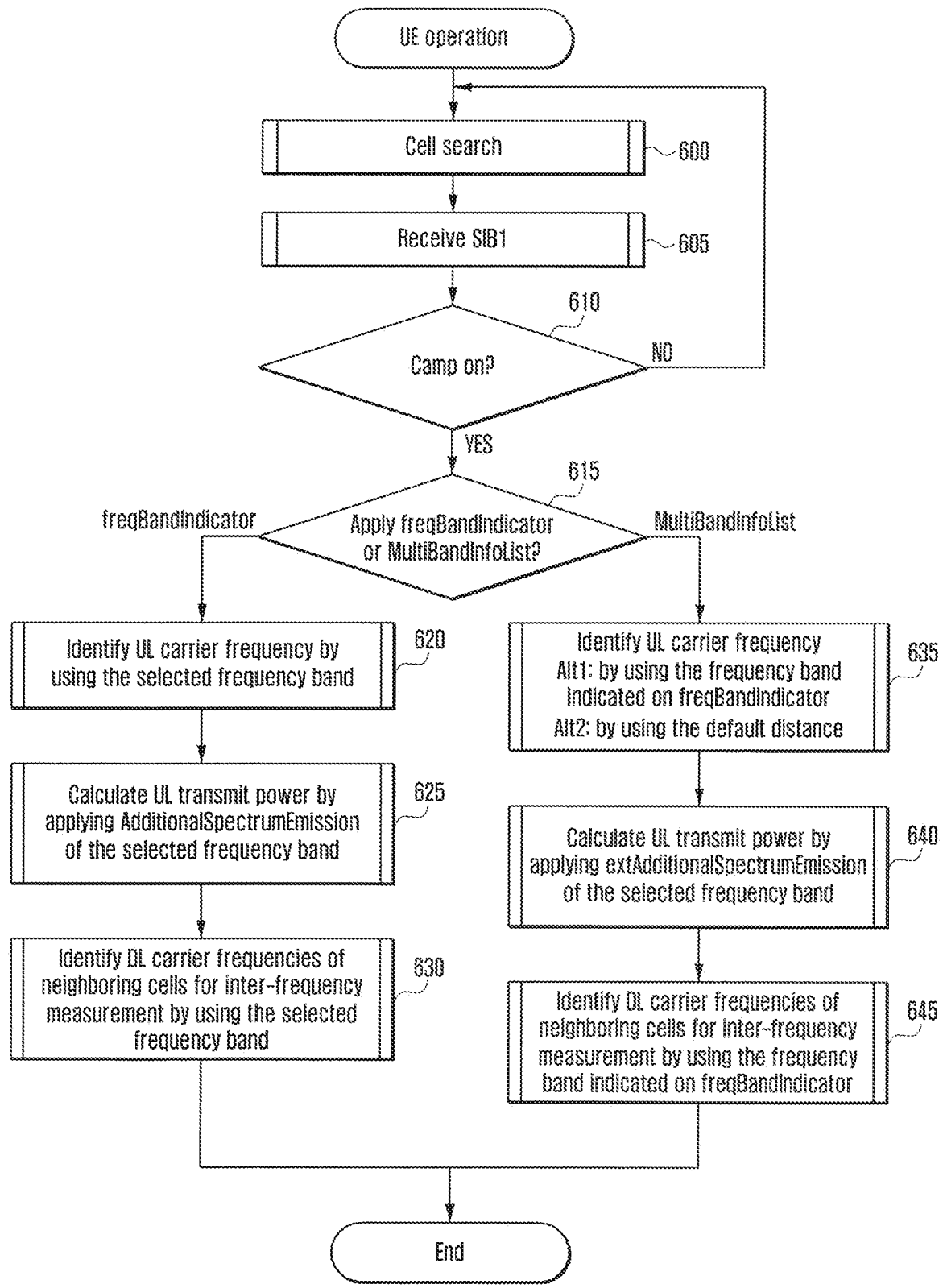
FIG. 6 is a flowchart illustrating a UE operation of a method according to an exemplary embodiment of the present invention.

FIG. 6 is a flowchart illustrating a UE operation of a method according to an exemplary embodiment of the present invention.

The UE performs cell searching to discover a cell to camp on at step 600. If a cell having an appropriate signal strength is found, the UE receives SIB1 broadcast by the eNB corresponding to the cell at step 605.

The UE checks the received SIB1 to determine whether the frequency band indicated by the freqBandIndicator or ExtfreqBandIndicator IEs included in the SIB1 is a supportable frequency band and whether the corresponding frequency band is capable of being authenticated for camp-on at step 610.

If it is determined not to camp on the cell, the UE returns the procedure to step 600 to perform the cell searching process again to discover another cell.

Otherwise, if it is determined to camp on the cell, the UE selects one of the frequency bands indicated by the freqBandIndicator IE or ExtfreqBandIndicator IE at step 615. At this time, since the legacy UE can only decode the freqBandIndicator IE, the procedure goes to step 620. Meanwhile, the non-legacy UE is capable of decoding both the freqBandIndicator and ExtfreqBandIndicator IEs. If the frequency band indicated in the ExtfreqBandIndicato IE is selected, the procedure goes to step 635.

At step 620, the UE calculates the uplink center frequency according to Equation (1). In the calculation, the NOffs-UL and FUL-low derived by applying the operating frequency band indicated by ul-CarrierFreq IE and freqBandIndicator included in the SIB2 are used.

The UE calculates the uplink transmission power using additionalSpectrumEmission IE included in the SIB2 at step 625. According to an exemplary embodiment of the present invention, when multiple extAdditionalSpectrumEmission IEs corresponding to multiple frequency bands are included, the uplink transmission power is calculated using the extadditionalSpectrumEmission IEs corresponding in sequence to the applied frequency bands among the frequency bands included in the ExtfreqBandIndicato IE.

The UE calculates the downlink center frequency of the neighbor E-UTRA cell at step 630. In the calculation, the NOffs-UL and FUL_low derived by applying the operating frequency band indicated by the dl-CarrierFreq IE and freqBandIndicator IE of the interFreqCarrierFreqInfo included in the SIB5 are used.

At step 635, the UE calculates the uplink center frequency. The present exemplary embodiment proposes two methods. The first method is to calculate the uplink center frequency according to Equation (1). In the calculation, the NOffs-UL and FUL_low derived by applying the operating frequency band indicated by the ul-CarrierFreq IE and freqBandIndicator IE included in the SIB2 are used. The second method is to calculate the uplink center frequency by applying the default distance to the corresponding frequency band.

The UE calculates the uplink transmission power using the extadditionalSpectrumEmission IE included in the SIB2 at step 640. Next, the UE calculates the downlink center frequency of the neighbor E-UTRA cell using Equation (5)

at step 645. In the calculation, the NOffs-UL and FUL_low derived by applying the operating frequency band indicated by the dl-CarrierFreq IE and freqBandIndicator IE of the interFreqCarrierFreqInfo included in the SIB5 are used.

Figure 7:
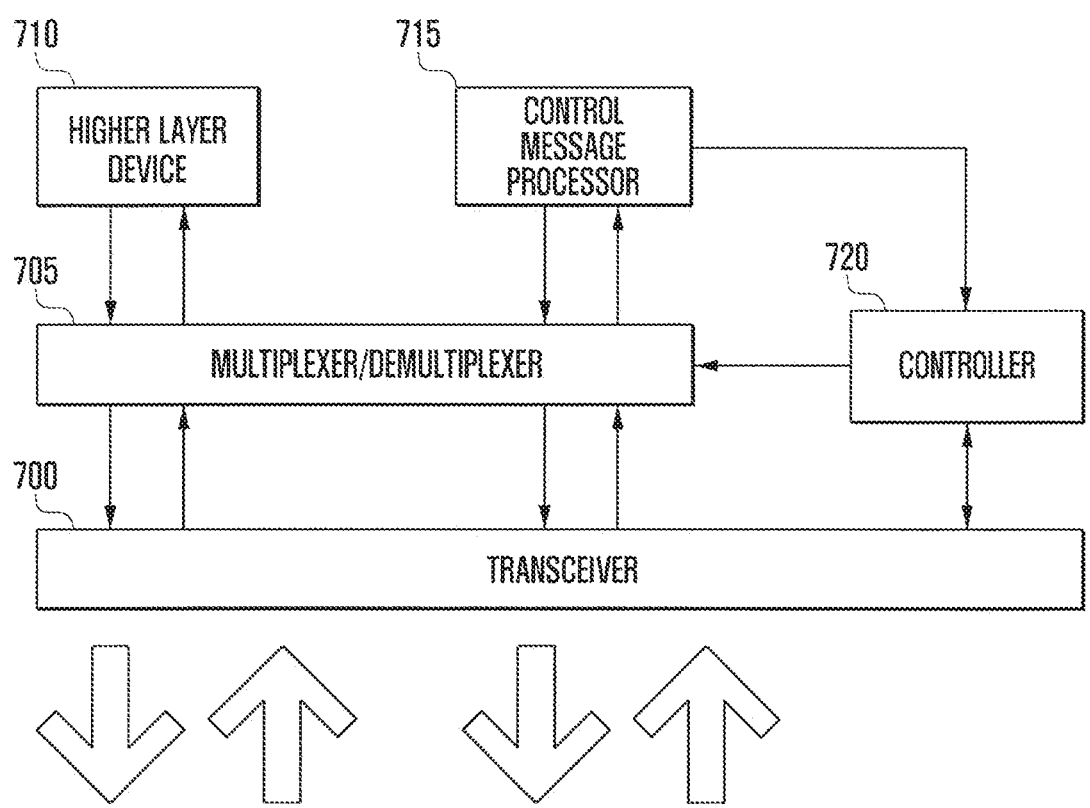
FIG. 7 is a block diagram illustrating a configuration of a UE according to an exemplary embodiment of the present invention.

FIG. 7 is a block diagram illustrating a configuration of a UE according to an exemplary embodiment of the present invention.

The UE includes higher layer device 710 for processing data and a control message processor 715 for processing control messages. The UE multiplexes the transmission data and control signals by means of the multiplexer 705 and transmits the multiplexed signals through the transceiver 700 under the control of the controller 720. The UE also demultiplexes the signal received through the transceiver 700 and delivers the demultiplexed signal to the higher layer device 710 or the control message processor 715 according to the message information.

In more detail, the controller 720 controls the UE to receive the first system information including a frequency band indicator indicating a frequency band supported by the eNB and an additional frequency band indicator indicating one or more frequency bands supported by the eNB. The controller 720 determines whether there is at least one supportable frequency band among the frequency bands indicated by the frequency band indicator and the additional frequency band indicators. If there is at least one supportable frequency band, the controller 720 controls the UE to attempt access to the eNB.

According to an exemplary embodiment of the present invention, if there are two or more supportably frequency bands among the frequency bands indicated by the additional frequency band indicators, the controller 720 is capable of controlling the UE to select the frequency band indicated by the first included frequency band indicator as the frequency band to access.

The controller 720 is capable of controlling the UE to receive the second system information including an additional spectrum emission value corresponding to the frequency band indicated by the frequency band indicator and at least one extra additional spectrum emission value corresponding to at least one frequency bands.

In this case, the at least one extra additional spectrum emission value corresponds to the frequency bands supported by the eNB in sequence according to the additional frequency band indicator.

The controller 720 calculates the uplink transmission power based on the spectrum emission value corresponding to the frequency band to which the UE attempts access.

Meanwhile, the second system information is capable of further including uplink carrier frequency information and, in this case, the controller 720 calculates the uplink center frequency based on the uplink carrier frequency information.

Figure 8:
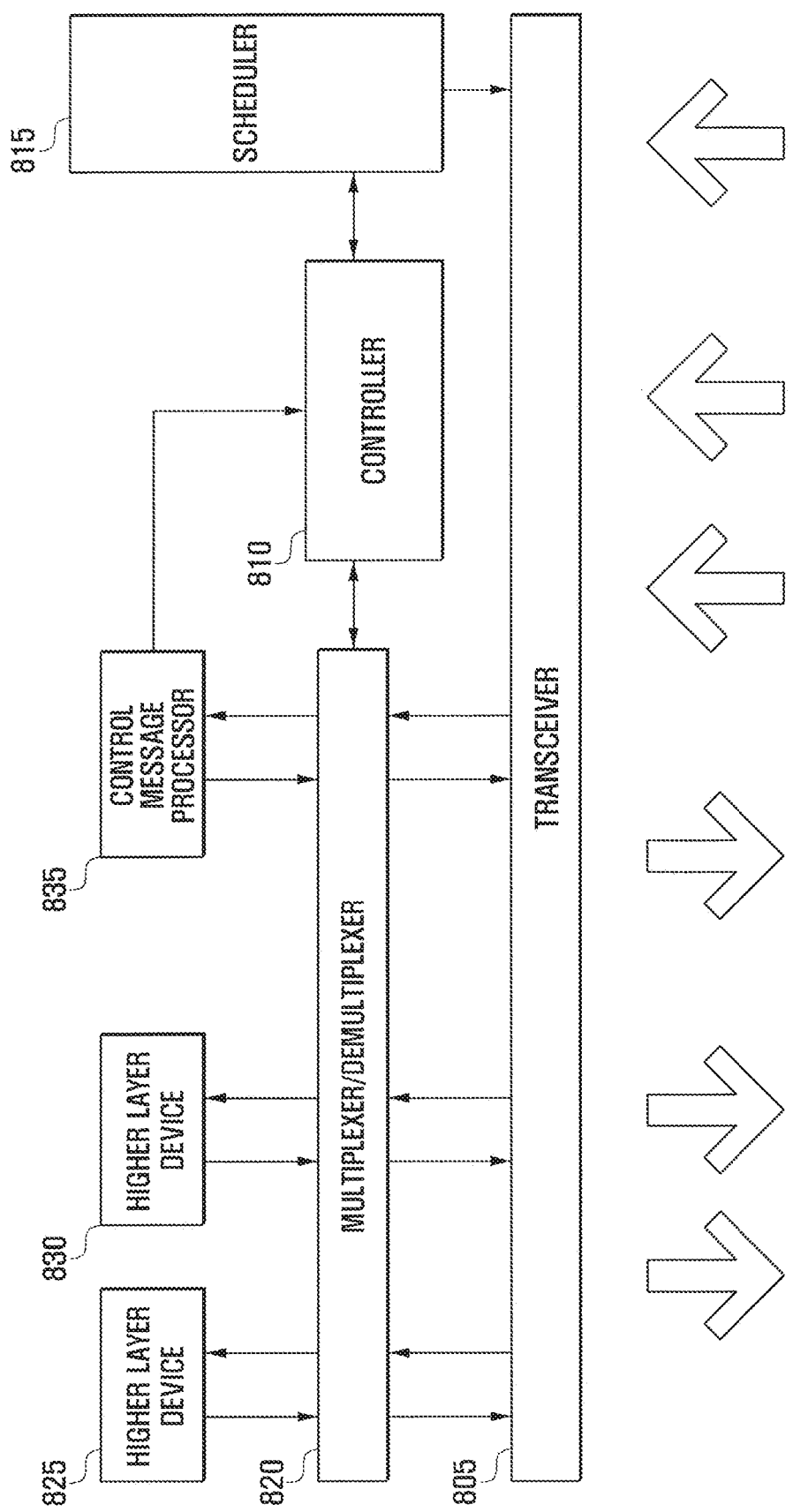
FIG. 8 is a block diagram illustrating a configuration of an eNB according to an exemplary embodiment of the present invention.

FIG. 8 is a block diagram illustrating a configuration of an eNB according to an exemplary embodiment of the present invention. Referring to FIG. 8, the eNB includes a transceiver 805, a controller 810, a multiplexer/demultiplexer 820, a control message processor 835, a plurality of higher layer processors 825 and 830, and a scheduler 815.

The transceiver 805 transmits data and control signals on the downlink carrier and receives data and control signals on the uplink carrier. In a case where multiple carriers are configured, the transceiver 805 transmits/receive data and controls signals on the multiple carriers.

The multiplexer/demultiplexer 820 multiplexes the data generated by the higher layer devices 825 and 830 and the control message processor 835 and demultiplexes the data received by the transceiver 805 and delivers the demultiplexed data to the appropriate higher layer processors 825 and 830, the control message processor 835, and the controller 810. The control unit 810 determines whether to additionally include ExtfrequencyBandIndicator IE in the SIB1 and whether to additionally include extadditionalSpectrumEmission IE in the SIB2 depending on whether the eNB support multiple frequency bands.

The control message processor 835 generates SIB1 and SIB2 to the lower layer according to the instruction of the controller 810.

The higher layer devices 825 and 830 are capable of being activated per UE per service to process and deliver a user service such as File Transfer Protocol (FTP) and Voice over Internet Protocol (VoIP) to the multiplexer/demultiplexer and process and deliver the data from the multiplexer/demultiplexer 820 to the service application on the higher layer.

The scheduler 815 allocates transmission resources to the UE at predetermined timing in consideration of the UE's buffer state, channel condition, and UE's Active Time; and controls the transceiver to process the signal transmitted by or to be transmitted to the UE.

In more detail, the controller 810 controls the eNB to generates the first system information including the frequency band indicator indicating a frequency band supported by the eNB and an additional frequency band indicator indicating at least one frequency band supported by the eNB. The controller 810 controls the eNB to broadcast the first system information.

The control unit 810 controls the eNB to generate the second system information including an additional spectrum emission value corresponding to the frequency band indicated by the frequency band indicator and at least one extra additional spectrum emission value corresponding to at least one frequency band indicated by the additional frequency band indicators. The controller 810 also controls the eNB to broadcast the second system information.

The above-described exemplary embodiments of the present invention can be summarized in that the eNB broadcasts a frequency band through a first FB-related information element and at least one frequency band through a second FB-related information element. The UE checks the frequency bands indicated by the first and second FB-related IEs to determine whether there is at least one supportable band and, if so, that the cell is accessible.

The eNB broadcasts an AdditionalSpectrumEmission information through the first additional emission-related IE and at least one AdditionalSpectrumEmission information through the second additional emission-related IE. The AdditionalSpectrumEmission of the first additional emission-related IE corresponds to the frequency band of the first IE, and the AdditionalSpectrumEmission of the second additional emission-related IE corresponds to the frequency band of the second IE.

The UE uses the AdditionalSpectrumEmission corresponding to the selected band to determine the uplink transmission power.

If one or more frequency bands are supported, the UE selects a frequency band according to a predetermined rule. The rule can be to select the FB filled first among the FBs included in the second IE.

According to another exemplary embodiment of the present invention, if the FB indicated in the first FB-related IE is selected, the UE determines the uplink center frequency using ARFCN information and, if the FB indicated by the first FB-related IE is not selected, determines the uplink center frequency by applying a default distance.

If the FB indicated by the first FB-related IE is not selected (or if the FB indicated by the second FB-related IE), the UE determines the uplink center frequency using the UL ARFCN information of the legacy IE and configures the uplink transmission power by applying Additional Spectrum Emission of the second additional emission-related IE.

As described above, the method and apparatus for supporting multiple frequency bands according to exemplary embodiments of the present invention are capable of supporting multiple frequency bands efficiently in an LTE-A Release-11 system to which new frequency bands are added as overlapping with the legacy frequency band.

While the invention has been shown and described in detail with reference to certain exemplary embodiments thereof, it will be understood by those skilled in the art that various changes in form and details may be made therein without departing from the spirit and scope of the present invention as defined in the appended claims and their equivalents.

What is claimed is:

1. A method performed by a terminal in a communication system, the method comprising:
receiving, from a base station, system information including a first list of multiple frequency band indicators indicating multiple frequency bands supported by a cell of the base station;
identifying whether at least two frequency bands are supported by the terminal from the multiple frequency bands supported by the cell;
selecting a frequency band among the at least two frequency bands supported by the terminal based on an order of the multiple frequency band indicators included in the first list, in case that the at least two frequency bands are supported by the terminal;
identifying information associated with an additional spectrum emission value for the selected frequency band among a plurality of information associated with the additional spectrum emission value, wherein the plurality of information associated with the additional spectrum emission value are signaled from the base station based on a number of the multiple frequency band indicators included in the first list;
identifying an uplink transmission power for the selected frequency band based on the information associated with the additional spectrum emission value; and
determining a downlink frequency band of a neighbor cell for measurement based on at least one frequency band indicator included in another system information,
wherein the selected frequency band corresponds to a frequency band indicator included in the first list, and
wherein the frequency band indicator is included first in the first list among at least two frequency band indicators indicating the at least two frequency bands supported by the terminal.

2. The method of claim 1, further comprising:
identifying the uplink transmission power based on spectrum emission information corresponding to the selected frequency band among multiple spectrum emission information.

3. The method of claim 1, wherein multiple spectrum emission information of a second list are signaled from the base station based on the number of the multiple frequency band indicators included in the first list.

4. The method of claim 3, further comprising:
applying spectrum emission information indicated by first listed spectrum emission information among spectrum emission information supported by the terminal from the second list for the multiple spectrum emission information.

5. The method of claim 1, wherein the system information includes the first list and a frequency band indicator indicating a frequency band supported by the cell of the base station.

6. A terminal in a communication system, the terminal comprising:
a transceiver; and
a controller configured to:
receive, from a base station via the transceiver, system information including a first list of multiple frequency band indicators indicating multiple frequency bands supported by a cell of the base station,
identify whether at least two frequency bands are supported by the terminal from the multiple frequency bands supported by the cell,
select a frequency band among the at least two frequency bands supported by the terminal based on an order of the multiple frequency band indicators included in the first list, in case that the at least two frequency bands are supported by the terminal,
identify information associated with an additional spectrum emission value for the selected frequency band among a plurality of information associated with the additional spectrum emission value, wherein the plurality of information associated with the additional spectrum emission value are signaled from the base station based on a number of the multiple frequency band indicators included in the first list,
identify an uplink transmission power for the selected frequency band based on the information associated with the additional spectrum emission value, and
determine a downlink frequency band of a neighbor cell for measurement based on at least one frequency band indicator included in another system information,
wherein the selected frequency band corresponds to a frequency band indicator included in the first list, and
wherein the frequency band indicator is included first in the first list among at least two frequency band indicators indicating the at least two frequency bands supported by the terminal.

7. The terminal of claim 6, wherein the controller is further configured to identify the uplink transmission power based on spectrum emission information corresponding to the selected frequency band among multiple spectrum emission information.

8. The terminal of claim 6, wherein multiple spectrum emission information of a second list are signaled from the base station based on the number of the multiple frequency band indicators included in the first list.

9. The terminal of claim 8, wherein the controller is further configured to apply spectrum emission information indicated by first listed spectrum emission information among spectrum emission information supported by the terminal from the second list for the multiple spectrum emission information.

10. The terminal of claim 6, wherein the system information includes the first list and a frequency band indicator indicating a frequency band supported by the cell of the base station.

11. A method performed by a base station in a communication system, the method comprising:
- generating system information including a first list of multiple frequency band indicators indicating multiple frequency bands supported by a cell of the base station; and
- transmitting the system information including the first list of the multiple frequency band indicators,
- wherein a frequency band is selected among at least two frequency bands supported by a terminal based on an order of the multiple frequency band indicators included in the first list, in case that the at least two frequency bands are supported by the terminal,
- wherein information associated with an additional spectrum emission value for the selected frequency band is identified among a plurality of information associated with the additional spectrum emission value,
- wherein the plurality of information associated with the additional spectrum emission value are signaled from the base station based on a number of the multiple frequency band indicators included in the first list,
- wherein an uplink transmission power for the selected frequency band is identified based on the information associated with the additional spectrum emission value,
- wherein a downlink frequency band of a neighbor cell for measurement is determined based on at least one frequency band indicator included in another system information,
- wherein the selected frequency band corresponds to a frequency band indicator included in the first list, and
- wherein the frequency band indicator is included first in the first list among at least two frequency band indicators indicating the at least two frequency bands supported by the terminal.

12. The method of claim 11, wherein the uplink transmission power is identified based on spectrum emission information corresponding to the selected frequency band among multiple spectrum emission information.

13. The method of claim 11, wherein multiple spectrum emission information of a second list is signaled from the base station based on the number of the multiple frequency band indicators included in the first list.

14. The method of claim 13, wherein spectrum emission information indicated by first listed spectrum emission information is applied among spectrum emission information supported by the terminal from the second list for the multiple spectrum emission information.

15. The method of claim 11, wherein the system information includes the first list and a frequency band indicator indicating a frequency band supported by the cell of the base station.

16. A base station in a communication system, the base station comprising:
- a transceiver; and
- a controller configured to:
  - generate system information including a first list of multiple frequency band indicators indicating multiple frequency bands supported by a cell of the base station, and
  - transmit, via the transceiver, the system information including the first list of the multiple frequency band indicators,
- wherein a frequency band is selected among at least two frequency bands supported by a terminal based on an order of the multiple frequency band indicators included in the first list, in case that the at least two frequency bands are supported by the terminal,
- wherein information associated with an additional spectrum emission value for the selected frequency band is identified among a plurality of information associated with the additional spectrum emission value,
- wherein the plurality of information associated with the additional spectrum emission value are signaled from the base station based on a number of the multiple frequency band indicators included in the first list,
- wherein an uplink transmission power for the selected frequency band is identified based on the information associated with the additional spectrum emission value,
- wherein a downlink frequency band of a neighbor cell for measurement is determined based on at least one frequency band indicator included in another system information,
- wherein the selected frequency band corresponds to a frequency band indicator included in the first list, and
- wherein the frequency band indicator is included first in the first list among at least two frequency band indicators indicating the at least two frequency bands supported by the terminal.

17. The base station of claim 16, wherein the uplink transmission power is identified based on spectrum emission information corresponding to the selected frequency band among multiple spectrum emission information.

18. The base station of claim 16, wherein multiple spectrum emission information of a second list are signaled from the base station based on the number of the multiple frequency band indicators included in the first list.

19. The base station of claim 18, wherein spectrum emission information indicated by first listed spectrum emission information is applied among spectrum emission information supported by the terminal from the second list for the multiple spectrum emission information.

20. The base station of claim 16, wherein the system information includes the first list and a frequency band indicator indicating a frequency band supported by the cell of the base station.

* * * * *